US011300968B2

(12) United States Patent
Pierson et al.

(10) Patent No.: US 11,300,968 B2
(45) Date of Patent: Apr. 12, 2022

(54) NAVIGATING CONGESTED ENVIRONMENTS WITH RISK LEVEL SETS

(71) Applicant: Massachusetts Institute of Technology, Cambridge, MA (US)

(72) Inventors: Alyssa Pierson, Somerville, MA (US); Wilko Schwarting, Cambridge, MA (US); Sertac Karaman, Cambridge, MA (US); Daniela L. Rus, Weston, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 421 days.

(21) Appl. No.: 16/283,158

(22) Filed: Feb. 22, 2019

(65) Prior Publication Data

US 2019/0354109 A1 Nov. 21, 2019

Related U.S. Application Data

(60) Provisional application No. 62/672,244, filed on May 16, 2018.

(51) Int. Cl.
*G05D 1/02* (2020.01)
*G06F 16/29* (2019.01)

(52) U.S. Cl.
CPC ......... *G05D 1/0223* (2013.01); *G05D 1/0214* (2013.01); *G06F 16/29* (2019.01); *G05D 2201/0213* (2013.01)

(58) Field of Classification Search
CPC .............. G05D 1/0223; G05D 1/0214; G05D 2201/0213; G06F 16/29; G08G 3/02;
(Continued)

(56) References Cited

U.S. PATENT DOCUMENTS 8,155,391 B1\* 4/2012 Tang .................. G06K 9/00651
382/113
9,216,745 B2\* 12/2015 Beardsley ............ G05D 1/0289
(Continued)

FOREIGN PATENT DOCUMENTS

EP 2615596 7/2013
JP 2002-042300 2/2002
(Continued)

OTHER PUBLICATIONS

Ames, et al.; "Control Barrier Function based Quadratic Programs with Application to Adaptive Cruise Control"; 53rd IEEE Conference on Decision and Control; pp. 6271-6278; Dec. 15-17, 2014; 8 Pages.
(Continued)

*Primary Examiner* — James J Lee
*Assistant Examiner* — Shon G Foley
(74) *Attorney, Agent, or Firm* — Daly, Crowley, Mofford & Durkee, LLP

(57) ABSTRACT

A method is disclosed for use in a planning agent, the method including: identifying a first agent in a vicinity of the planning agent; identifying a location of the first agent and a velocity of the first agent; calculating a set of occupancy costs for the first agent, each occupancy cost in the set of occupancy costs being associated with a different respective location in the vicinity of the planning agent, each occupancy cost in the set of occupancy costs being calculated at least in part based on a cost function that depends on the location of the first agent and the velocity of the first agent; and changing at least one of speed or direction of travel of the planning agent based on the set of occupancy costs.

20 Claims, 10 Drawing Sheets

(58) Field of Classification Search
CPC ..... G08G 1/166; G01S 15/931; G01S 17/931; B60T 2201/08; B60T 2201/022; B60T 7/22

See application file for complete search history.

(56) References Cited

U.S. PATENT DOCUMENTS

| | | | |
|---|---|---|---|
| 10,429,197 B1* | 10/2019 | Carrino | H04W 4/02 |
| 2016/0137206 A1 | 5/2016 | Chandraker et al. | |
| 2016/0299507 A1* | 10/2016 | Shah | G01C 21/203 |
| 2017/0320500 A1 | 11/2017 | Yeo et al. | |
| 2020/0117211 A1* | 4/2020 | Paglieroni | G05D 1/0217 |
| 2021/0027182 A1* | 1/2021 | Harris | G06N 99/00 |
| 2021/0116930 A1 | 4/2021 | Ariki | |

FOREIGN PATENT DOCUMENTS

| | | |
|---|---|---|
| JP | 2003-063430 | 3/2003 |
| JP | 2006-154967 | 6/2006 |
| JP | 2009-169535 | 7/2009 |
| JP | 2010-018062 | 1/2010 |
| JP | 2010-173511 | 8/2010 |
| JP | 2011-170762 | 9/2011 |
| JP | 2016-024318 | 2/2016 |
| JP | 2017-091138 | 5/2017 |

OTHER PUBLICATIONS

Belta, et al.; "Discrete Abstractions for Robot Motion Planning and Control in Polygonal Environments"; IEEE Transactions on Robotics; vol. 21; No. 5; pp. 864-874; Oct. 2005; 11 Pages.

Borrmann, et al.; "Control Barrier Certificates for Safe Swarm Behavior"; IFAC—PapersOnLine; Analysis and Design of HybridSystems ADHS; vol. 48; No. 27; pp. 68-73; Jan. 2015; 6 Pages.

Brock, et al.; "High-Speed Navigation Using the Global Dynamic Window Approach "; Proceedings of the 1999 IEEE International Conference on Robotics and Automation; vol. 1; pp. 341-346; May 1999; 6 Pages.

Chowdhury, et al.; "Particle hopping models for two-lane traffic with two kinds of vehicles: Effects of lane-changing rules," Physica A: Statistical Mechanics and its Applications; vol. 235; No. 3; pp. 417-439; Jan. 1997; 23 Pages.

Goerzen, et al.; "A Survey of Motion Planning Algorithms from the Perspective of Autonomous UAV Guidance"; Journal of Intelligent and Robotic Systems; vol. 57; No. 1-4; pp. 65-100; Jan. 2010; 36 Pages.

Hidas; "Modelling lane changing and merging in microscopic traffic simulation"; Transportation Research Part C: Emerging Technologies; vol. 10; No. 56; pp. 351-371; Jan. 2002; 21 Pages.

Jula, et al.; "Collision Avoidance Analysis for Lane Changing and Merging"; IEEE Transactions on Vehicular Technology; vol. 49; No. 6; pp. 2295-2308; Nov. 2000; 14 Pages.

Lawitzky, et al.; "Interactive Scene Prediction for Automotive Applications"; 2013 IEEE Intelligent Vehicles Symposium (IV); pp. 1028-1033; Jun. 23-26, 2013; 6 Pages.

Naranjo, et al.; "Lane-Change Fuzzy Control in Autonomous Vehicles for the Overtaking Maneuver" IEEE Transactions on Intelligent Transportation Systems; vol. 9; No. 3; pp. 438-450; Sep. 2008; 13 Pages.

Ogren, et al.; "A Convergent Dynamic Window Approach to Obstacle Avoidance"; IEEE Transactions on Robotics; vol. 21; No. 2; pp. 188-195; Apr. 2005; 8 Pages.

Panagou, et al.; "Distributed coordination control for multi-robot networks using Lyapunov-like barrier functions"; IEEE Transactions on Automatic Control; vol. 61; No. 3; pp. 617-632; Mar. 2016; 31 Pages.

Pendleton, et al.; "Perception, Planning, Control, and Coordination for Autonomous Vehicles"; MDPI; Machines 2017, 5, 6; Feb. 17, 2017; 54 Pages.

Schildbach, et al.; "Scenario Model Predictive Control for Lane Change Assistance on Highways"; 2015 IEEE Intelligent Vehicles Symposium (IV); pp. 611-616; Jun. 2015; 6 Pages.

Schlegel; "Fast Local Obstacle Avoidance under Kinematic and Dynamic Constraints for a Mobile Robot"; Proceedings of the 1998 IEEE/RSJ International Conference on Intelligent Robots and Systems; vol. 1; pp. 594-599; Oct. 1998; 6 Pages.

Schwarting, et al.; "Planning and Decision-Making for Autonomous Vehicles"; Annual Review of Control, Robotics, and Autonomous Systems; pp. 187-210; Jan. 12, 2018; 26 Pages.

Schwarting, et al.; "Recursive Conflict Resolution for Cooperative Motion Planning in Dynamic Highway Traffic"; 2014 IEEE $17^{th}$ International Conference on Intelligent Transportation Systems (ITSC); pp. 1039-1044; Oct. 8-11, 2014; 6 Pages.

Shalev-Shwartz, et al.; "Safe, Multi-Agent, Reinforcement Learning for Autonomous Driving"; CoRR; vol. abs/1610.03295; Oct. 11, 2016; 13 Pages.

Wagner, et al.; "Realistic multi-lane traffic rules for cellular automata"; Physica A: Statistical Mechanics and its Applications; vol. 234; No. 3; pp. 687-698; Jan. 1997; 12 Pages.

Ranjeet Singh Tomar, Shekhar Verma, Neural Network Based Lane Change Trajectory, Prediction in Autonomous Vehicles, Indian Institute of Information Technology—Allahabad, Deoghat, Jhalwa, Allahabad—211012, India, 2011, 22 pages.

Notification of Transmittal of the International Search Report and the Written Opinion of the ISA dated Jul. 29, 2019 for International Application No. PCT/US2019/032177; 1 Page.

International Search Report dated Jul. 29, 2019 for International Application No. PCT/US2019/032177; 5 Pages.

Written Opinion of the ISA dated Jul. 29, 2019 for International Application No. PCTUS2019/032177, 8 Pages.

International Preliminary Report on Patentability dated Nov. 26, 2020 for International Application No. PCT/US2019/032177; 8 Pages.

Exam Report dated Aug. 18, 2021 for European Application No. 19729115.6; 7 pages.

Response to European Communication pursuant to Rules 161 and 162 EPC dated Dec. 23, 2020 for European Application No. 19729115.6; Response filed on Jun. 15, 2021; 3 Pages.

Japanese Office Action dated Jan. 4, 2022 for Japanese Application No. 2020-560919; 9 pages.

European Response to Official Communication dated Jan. 14, 2022 for European Application 19729115.6; 20 pages.

* cited by examiner

- □ RISK COST COEFFICIENT < 0.2
- ▨ 0.2 < RISK COST COEFFICIENT < 0.4
- ▦ 0.4 < RISK COST COEFFICIENT < 0.7
- ▩ RISK COST COEFFICIENT > 0.7

NAVIGATING CONGESTED ENVIRONMENTS WITH RISK LEVEL SETS

CROSS-REFERENCE TO RELATED APPLICATIONS

This application claims the benefit of U.S. Provisional Application 62/672,244, filed May 16, 2018 and entitled "Navigating Congested Environments With Risk Level Sets", the entire contents of which are incorporated by reference herein.

GOVERNMENT LICENSE RIGHTS

This invention was made with Government support under Grant No. IIIS-1724058 awarded by the National Science Foundation (NSF) and Grant No. N00014-12-1-1000 awarded by the Office of Naval Research (ONR). The Government has certain rights in the invention.

BACKGROUND

As is known in the art, there is a trend toward the use of autonomous vehicles. In some locations (e.g. city or heavily populated environments), autonomous vehicles will operate in frequently changing, congested and cluttered environments.

SUMMARY

In accordance with the concepts, systems and techniques described herein, it has been recognized that to successfully navigate a dynamic environment, one may first quantify the level of congestion in the environment. Once the environmental congestion is known, an agent may choose a control law such that the agent avoid collisions with obstacles and other agents in the environment.

Disclosed is an improved technique for navigating autonomous agents across congested and cluttered environments that is based on occupancy cost sets that quantify the level of risk at different locations in the environment in which autonomous agents are traveling. Using risk level sets reduces the control space for an agent (e.g., a vehicle or other machine as will be described in detail herein after), which facilitates collision avoidance. The disclosed technique is particularly useful in applications that require exploring a cluttered environment, or navigating in crowds or traffic. In situations where the number of obstacles may change, the disclosed technique scales with the density of the environment, both providing a metric of congestion to the agent and adjusting the control space.

According to aspects of the disclosure, a method is provided for use in a planning agent (e.g., an agent planning a path), the method comprising: identifying a first agent in a vicinity of the planning agent; identifying a location of the first agent and a velocity of the first agent; calculating a set of occupancy costs for the first agent, each occupancy cost in the set of occupancy costs being associated with a different respective location in the vicinity of the planning agent, each occupancy cost in the set of occupancy costs being calculated at least in part based on a cost function that depends on the location of the first agent and the velocity of the first agent; and changing at least one of speed or direction of travel of the planning agent based on the set of occupancy costs.

According to aspects of the disclosure, an apparatus is provided comprising an acceleration system; a steering system; and a processing circuitry operatively coupled to the acceleration system, and the steering system, the processing circuitry being configured to: identify a first agent in a vicinity of the apparatus; identify a location of the first agent and a velocity of the first agent; calculate a set of occupancy costs for the first agent, each occupancy cost in the set of occupancy costs being associated with a different respective location in the vicinity of the apparatus, each occupancy cost in the set of occupancy costs being calculated at least in part based on a cost function that depends on the location of the first agent and the velocity of the first agent; and change at least one of speed or direction of travel of the apparatus based on the set of occupancy costs.

According to aspects of the disclosure, a non-transitory computer-readable medium is provided that stores one or more processor-executable instructions which when executed by a processing circuitry of a planning agent cause the processing circuitry to perform the operations of: identifying a first agent in a vicinity of the planning agent; identifying a location of the first agent and a velocity of the first agent; calculating a set of occupancy costs for the first agent, each occupancy cost in the set of occupancy costs being associated with a different respective location in the vicinity of the planning agent, each occupancy cost in the set of occupancy costs being calculated at least in part based on a cost function that depends on the location of the first agent and the velocity of the first agent; and changing at least one of speed or direction of travel of the planning agent based on the set of occupancy costs.

In one aspect of the concepts, systems and techniques, the use of risk level sets to navigate a cluttered environment is described. A cost function is introduced that quantifies the level of congestion from both the location of other obstacles and agents, as well as their movement through the environment. This cost function allows the measurement of occupancy for points in the environment and map it to a measure of risk for an agent attempting to navigate to that point. Agents are allowed to choose a risk threshold from level sets established through the cost function. By construction, a conservative agent chooses a lower risk threshold, while an aggressive agent chooses a higher risk threshold. Agents are allowed to make any control action within this set, and in doing so, they are guaranteed to avoid collisions with other agents and obstacles.

The approach described herein is useful to a number of applications in multi-agent systems. Using risk level sets reduces the control space for an agent, which increase the chance of (and ideally, guarantees) collision avoidance. This is particularly useful in applications requiring exploration or navigation of a cluttered environment, or navigation of crowds or traffic. In situations where the number of obstacles may change, the technique described herein scales with the density of the environment, both providing a metric of congestion to the agent and adjusting the control space. In some implementations, the control space may include the set of all valid control inputs to a system such that the system remains within a defined level set.

In one aspect, the manner in which risk level sets may be applied to autonomous vehicles. For self-driving cars to fully integrate into daily lives, they must interact with other human drivers and respond to everyday traffic scenarios. In the case of highway navigation, an autonomous vehicle will need to adapt to varying levels of traffic and congestion along the road. In one example, the problem of an autonomous vehicle planning a sequence of lane changes along a highway is used to demonstrate the one aspect of the techniques described herein. Using a congestion cost metric, a vehicle may rapidly assesses a level of congestion on a road. To plan a sequence of lane changes, the technique maps cost to a weighted graph along a planning horizon, and uses Djikstra's Algorithm to find a fastest route through traffic while avoiding collisions with other cars. Using the risk level set formulation described herein, one may demonstrate how an agent's choice of risk threshold manifests as varying behavior; conservative drivers with lower risk thresholds will make fewer lane changes, while aggressive drivers with a higher risk threshold attempt more lane changes.

It will be understood that this Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

According to aspects of the disclosure, an example of a model is provided for calculating or otherwise determining occupancy scores associated with different locations in an environment. The model can be used by a planning agent to determine respective occupancy scores for different locations around the planning agent, and it takes into account: (i) the position and one or more other characteristics of the planning agent, and (ii) the respective position and one or more other characteristics of at least one neighboring agent that is situated in the vicinity of the planning agent. According to the model, the neighboring agents in the vicinity of the planning agent are treated as dynamic obstacles. In an environment an environment $Q \subset \mathbb{R}^N$, with points in Q denoted q. For n agents in the environment, the position of each agent is denoted in the model as $x_i$, for $i \in \{1, \ldots, n\}$. According to the model, the planning agent is the planning agent, with position denoted $x_e$. The model assumes that all agents have double-integrator dynamics, such that $$\ddot{x}_i = u_i, \qquad \text{(Eq. 1)}$$

where $u_i$ is the control input for each agent. In some implementations, the model also assumes that all agents have maximum speed and acceleration, such that $\|\ddot{x}_i\| < a_i$ and $\|\dot{x}_i\| < v_i$, where $a_i$ and $v_i$ are the maximum acceleration and velocity, respectively.

The model introduces an occupancy cost, H, which captures both the density of agents at a location, as well as their intended direction of motion. The cost is calculated based on all agents in the environment, defined by Equation 2 below:

$$H(q, x, \dot{x}) = \sum_{i=1}^{n} \frac{\exp(-(q-x_i)^T \Omega (q-x_i))}{1 + \exp(-\alpha \dot{x}_i^T (q-x_i))}, \qquad \text{(Eq. 2)}$$

where $\Omega$ is the diagonal matrix of the inverse square of the standard deviation, $x_i$ is the location of a neighboring agent (e.g., an agent located near the planning agent), and q is a location on the road for which the cost is calculated. In $\mathbb{R}^2$, $$\Omega = \text{diag}\left\{\frac{1}{\sigma_x^2}, \frac{1}{\sigma_y^2}\right\}.$$

Figure 5A:
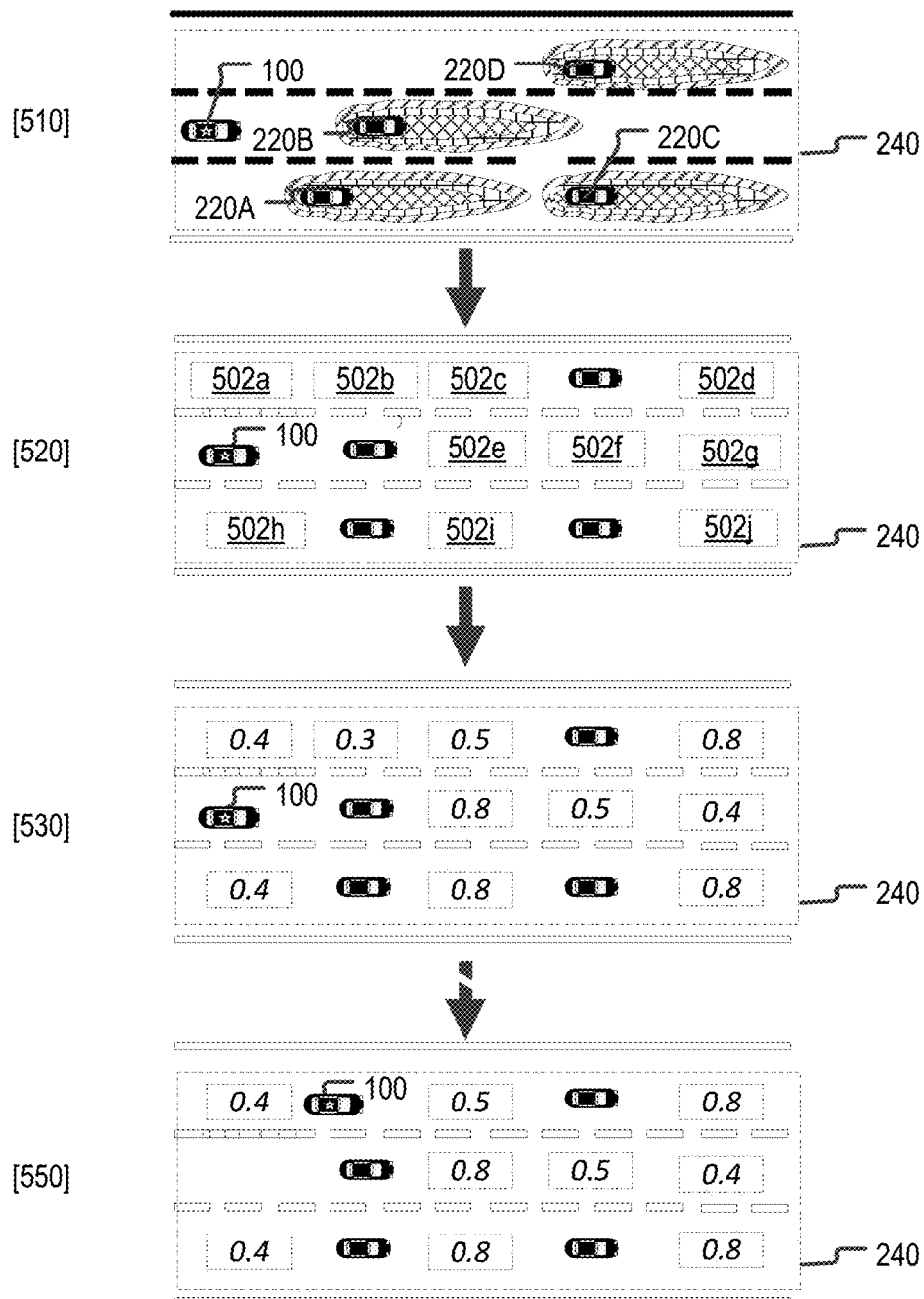
FIG. 5A is diagram illustrating the operation of a process for navigating a planning agent based on a set of occupancy costs, according to aspects of the disclosure.

It should be noted that the construction of H is a Gaussian peak multiplied by a logistic function. As illustrated in FIGS. 5A and B, the Gaussian peak represents an estimate of an agent's position in a predetermined future time period (e.g., in the next 5 seconds), while the logistic function skews this estimate in the direction of the velocity. By skewing the position by the velocity, the occupancy cost H is higher along points in the direct path of the agent's motion, and lower otherwise.

According to the model, the cost function is used as a proxy for the intention of the other agents in the system. In highly-cluttered and congested environments, it is impractical for the planning agent to know (at all times) the control laws of all other agents in the system. In this regard, using the present model to calculate the agent's position is advantageous because the model permits the position to be calculated only based on observed respective velocities and/or accelerations of neighboring agents. Since H is defined in the local reference frame of the planning agent, these respective velocit(ies) and the respective acceleration(s) may be expressed, in some implementations, relative to a position of the planning agent.

In some implementations, the model assumes that all agents (e.g., other than the planning agent) are self-preserving. Under the assumption of self-preserving agents, it is possible to find the appropriate risk thresholds for the agents to guarantee collision avoidance. In this regard, the present disclosure proposes that there is some cost threshold that, if an agent stays below that threshold, is guaranteed to avoid collisions. Let $H_c$ define the cost at which a collision occurs. For self-preserving agents, the goal is for an agent to never exceed this cost. Given the dynamics of the system, a cost threshold $H_T$ can be defined as a maximum threshold, where $H_T<H_c$. If the agent stays within this cost, they will always have sufficient stopping distance to avoid collisions. Finally, a planning threshold $H_P$ for an agent may be defined, wherein $H_P \leq H_T$. If an agent chooses the maximum allowable risk, then $H_P=H_T$, but for any agent choosing a lower risk, $H_P<H_T$.

In some implementations, the establishment of the planning threshold $H_P$ allows a risk level set to be constructed, for a particular environment, by choosing all values of $H<H_P$, defined $$L_{\bar{p}} = \{q|H(q-x_e, \dot{x}_i) \leq H_P\}. \qquad \text{(Eq. 3)}$$

where $x_e$ is the location of the planning agent, q is a location on the road, and $\dot{x}_i$ is the speed of a neighboring agent.

According to the present disclosure, by planning actions within its risk level set $L_{\bar{p}}$, an agent may be able to avoid collisions with all other agents and obstacles. In support of this proposition, a series of proofs are presented further below that define the various risk thresholds of the system. The series of proofs are presented with respect to Lemma 1, Lemma 2, and Theorem 2, which are defined below. Lemma 1 shows that it is possible to analytically devise the maximum cost before collision $H_c$. Lemma 2 provides a formalistic method for defining the planning threshold $H_T$. And Theorem 1 shows that if an agent starts inside $L_{\bar{p}}$ and plans all future actions within their risk level set, the cost will never exceed $H_c$, thus avoiding collisions. From the two-agent system, it is possible to extend these results to multiple agents and obstacles in the system.

Two-Agent System

Consider a two-agent system comprising the planning agent (e.g., located at $x_e$, and another agent, located at $x_i$). Without loss of generality, the dynamics of the system can be expressed such that the planning agent appears stationary at the origin. In this modified reference frame, $v_i$ is defined as the velocity of $x_i$, and $a_i$ is defined as the acceleration of $x_i$. Using these dynamics, $R_b$ is defined as the braking distance of $x_i$ when traveling at its maximum velocity, $\dot{x}_i$, and $r_c$ as the safety radius of the vehicle enclosing its extent. A collision is thus defined when $\|d\| \leq r_c$.

To choose a control action, the cost needs to be calculated at the location of the planning agent. Let $d=(x_e-x_i)$, expressed in the modified coordinate frame such that $x_e$ is the origin. The cost for the two-agent system can be written as:

$$H(d, \dot{x}_i) = \frac{\exp(-d^T \Omega d)}{1 + \exp(-\alpha \dot{x}_i^T d)}. \qquad \text{(Eq. 4)}$$

For our planning agent to avoid collisions, the distance between the two agents must satisfy $\|d\|>r_c$. In Theorem 1, it is shown that by the properties of H, collision avoidance also means the cost H never exceeds a maximum cost $H_c$. From $r_c$, the safety radius of the vehicle, the following Lemma summarizes the calculation of $H_c$.

Lemma 1 For a two-agent system with cost H defined in (3), the maximum cost before collision $H_c$ is defined according to Equation 5 below:

$$H_c = \frac{\exp\left(-\frac{r_c^2}{\sigma_m^2}\right)}{1 + \exp(-\alpha v_i r_c)}, \text{ where } \frac{1}{\sigma_m^2} = \min\left\{\frac{1}{\sigma_x^2}, \frac{1}{\sigma_y^2}\right\}. \qquad \text{(Eq. 5)}$$

Proof.

To calculate the maximum value of $H_c$ before collision, evaluate H when $\|d\|=r_c$. Let $u_i$ represent the unit vector $$u = \frac{d}{\|d\|}.$$

The safety radius can be written $r_c u$. Substituting this into the expression of cost yields:

$$H(r_c u, \dot{x}_i) = \frac{\exp(-r_c^2 u^T \Omega u)}{1 + \exp(-\alpha r_c \dot{x}_i^T u)} \qquad \text{(Eq. 6)}$$

Note that the value of $u^T \Omega u$ depends on the direction of u. Define $$\frac{1}{\sigma_m^2} = \min\left\{\frac{1}{\sigma_x^2}, \frac{1}{\sigma_y^2}\right\}.$$

From $$\frac{1}{\sigma_m^2} \leq u^T \Omega u,$$

it follows that $$\exp\left(-\frac{r_c^2}{\sigma_m^2}\right) \geq \exp(-r_c^2 u^T \Omega u).$$

The value of $H_c$ will depend on the value of $(1+\exp(-\alpha r_c \dot{x}_i^T u))$ in the denominator. To find the largest value of $H_c$, it is necessary to find the smallest value of the denominator. Note the value of $\exp(-\alpha r_c \dot{x}_i^T u)$ also depends on the relationship between $\dot{x}_i$ and u. If $x_i$ is moving away from $x_e$, then $\dot{x}_i^T u<0$, which drives the overall value of H toward zero. Thus $H(r_c u, \dot{x}_i)$ increases when $\dot{x}_i=vu$, where v is the magnitude of the velocity. Given a maximum velocity $v_i$, it follows that:

$$H(r_c u, \dot{x}_i) \leq \frac{\exp\left(-\frac{r_c^2}{\sigma_m^2}\right)}{1 + \exp(-\alpha r_c v_i)}.$$

Since $H_c$ is the maximum value of $H(r_c u, \dot{x}_i)$, it follows $$H_c = \frac{\exp\left(-\frac{r_c^2}{\sigma_m^2}\right)}{1 + \exp(-\alpha r_c v_i)},$$

which is equivalent to (Eq. 5).

From Lemma 1, it can be seen that the maximum cost $H_c$ occurs when an agent is traveling at its maximum velocity at its safety radius. For vehicles with single-integrator dynamics that can stop instantaneously, our agents could generate a level set based on this threshold and avoid collisions. However, if the agents cannot stop instantaneously, then a cost of $H_c$ would cause a collision. Instead, we also need to find the value of cost that prevents collisions given a minimum braking distance. For a braking distance $R_b$, Lemma 2 defines the maximum threshold cost $H_T$. We use $H_T$ when choosing our planned risk threshold $H_P \leq H_T$.

Lemma 2 For the two-agent system with cost H defined in (3), the maximum threshold to avoid collisions $H_T$ is defined $$H_T = \frac{\exp\left(-\frac{R_b^2}{\sigma_u^2}\right)}{2} \quad \text{(Eq. 7)}$$

where $\sigma_u = \max\{\sigma_x, \sigma_y\}$.

Proof.

Similar to Lemma 1, the maximum threshold cost can be found by looking at the requirements to guarantee the safe braking distance. Recall that $R_b$ is the braking distance of $x_i$, such that it will never collide with $x_e$. To guarantee the self-preservation, the threshold cost will be the minimum value of H at this distance $\|d\|=R_b$. For the unit vector $$u = \frac{d}{\|d\|},$$

it follows that $$H(R_b u, \dot{x}_i) = \frac{\exp(-R_{b_i}^2 u^T \Omega u)}{1 + \exp(-\alpha R_b \dot{x}_i^T u)}.$$

In Lemma 1, the maximum value of H was found to calculate $H_c$. In Lemma 2, however, the minimum value of H is found to calculate $H_T$. Note that the value of $u^T \Omega u$ depends on the orientation and values of $\sigma_x$ and $\sigma_y$. However, we know $$H(R_b u, \dot{x}_i) \geq \frac{\exp\left(\frac{-R_{b,i}^2}{\sigma_u^2}\right)}{1 + \exp(-\alpha R_b \dot{x}_i^T u)}$$

for $\sigma_u = \max\{\sigma_x, a_y\}$. Here, it can be observed that the value of H decreases as the denominator (e.g., $1+\exp(-\alpha R_b \dot{x}_i^T u)$, etc.) increases. Note that for some positive constant c, $\exp(-c) \leq 1$. The largest value of the denominator occurs when $\dot{x}_i = 0$. Any velocity in the direction of u would result in a larger value of H. Thus, $$H(R_b u, \dot{x}_i) \geq \frac{\exp\left(\frac{-R_{b,i}^2}{\sigma_u^2}\right)}{2}.$$

By choosing the smallest value of $H(R_b, \dot{x}_i)$ as $H_T$, the expression in (Eq. 6) is found.

According to aspects of the disclosure, to avoid collisions, the planning agent stays within $L_{\bar{p}}$, their risk level set, defined in (Eq. 3) by some choice of $H_P \leq H_T$. By construction, it can be seen that the chosen value of $H_P$ correlates with how close the planning agent will get next to other agents. Intuitively, a smaller value of $H_P$ corresponds to larger separations between the planning agent (and other agents, hence a "less risky" maneuver. In Theorem 1 it is demonstrated that for agents starting in $L_{\bar{p}}$ and only planning actions that stay below this risk level set, the cost will never exceed $H_c$.

Theorem 1 For a planning agent starting with some initial cost $H < H_P$ and operating within the set of points defined by $L_{\bar{p}}$, the total cost will never exceed $H_c$.

Proof.

Consider a two-agent system, with planning vehicle $x_e$ and other vehicle $x_i$, and all dynamics written such that the ego vehicle appears stationary at the origin. Given the initial cost is below $H_T$, it is known that $\|d\| > R_b$, the braking distance for the other vehicle. To prove that the cost will never exceed $H_c$, its dynamics are examined. Recall $$H(d, \dot{x}_i) = \frac{\exp(-d^T \Omega d)}{1 + \exp(-\alpha \dot{x}_i^T d)}.$$

Now consider the function $$W(r) = \frac{\exp\left(-\frac{r^2}{\sigma_m^2}\right)}{1 + \exp(-\alpha v_{max} r)},$$

where $v_{max}$ is the maximum magnitude of velocity of $\dot{x}_i$ and r is the distance between the two agents, $r=\|d\|$. By inspection, $W(\|d\|) \geq H(d, \dot{x}_i)$ and that for $\|d\|=r_c$, $W(r_c)=H_c$. The derivative of W is $$\dot{W} = \frac{-2r\dot{r}\exp\left(-\frac{r^2}{\sigma_m^2}\right)}{\sigma_m^2(1+\exp(-\alpha v_{max} r))} - \frac{(-\alpha v_{max} r\dot{r})\exp\left(-\alpha v_{max} r - \frac{r^2}{\sigma_m^2}\right)}{r(1+\exp(-\alpha v_{max} r))^2}.$$

From the derivative, $\dot{W}$ is not always decreasing as r increases. $\dot{W}$ can be re-written as:

$$\dot{W} = \left[\frac{-2}{\sigma_m^2} + \frac{\alpha v_{max} \exp(-\alpha v_{max} r)}{r(1+\exp(-\alpha v_{max} r))}\right]\beta, \quad \text{(Eq. 8)}$$

-continued where $\beta = \dfrac{r \vdash \exp\left(\dfrac{-r^2}{\sigma_m^2}\right)}{(1+\exp(-\alpha v_{max}r))} \geq 0$.

The sign of $\dot{W}$ then depends on choosing an $\alpha$ such that $$\frac{\alpha v_{max}\exp(-\alpha v_{max}r_c)}{(1+\exp(-\alpha v_{max}r_c))} < \frac{2r_c}{\sigma_m^2}.$$

Thus, given the values of $r_c$, $\sigma_m$, and $v_{max}$, we can choose $\alpha$ such that such that $\dot{W}<0$ for $r>r_c$.

Since $W(r)$ is always greater than H for $\|d\|>r_c$, and $\dot{W}<0$ for increasing r, then $H(d, \dot{x}_i)<H_c$ for any $\|d\|>r_c$. Thus, the cost $H(d, \dot{x}_i)$ will never exceed $H_c$ unless the agents collide. For agents operating within $L_{\bar{p}}$, to stay in $L_{\bar{p}}$ requires only choosing points such that $H(\bullet)<H_P<H_c$, thus any agent starting in $L_{\bar{p}}$ will never choose an action that results in $H>H_c$, completing the claims of Theorem 1.

As shown in Theorem 1, an agent starting within $L_{\bar{p}}$ will never exceed the collision threshold $H_c$. If all agents in the system stay within their respective thresholds $L_{\bar{p},i}$, then all agents will never leave these sets. However, the present example does not assume all agents in the system use the same control laws. Rather, the present example assumes only that the agents are self-preserving. Due to this property, there may be situations in which the planning agent experiences a cost greater than $H_P$, but never exceeding $H_T$. Consider the scenario of the planning agent directly following the other agent in the environment. If the other agent brakes suddenly, the planning agent will experience an increase in cost as it moves towards the other agent. However, since $H_T$ is chosen to include a braking distance, then as soon as the planning agent sees $H>H_P$, it can begin braking to avoid collision and maintain $H<H_c$.

Multiple-Agent System

Using the claims from Theorem 1 for two agents, this section extends those results to multiple agents in the environment. For two agents, the disclosure introduced H, which maps the position of the other agent to an occupancy cost in the environment, allowing for the definition of a risk threshold and $L_{\bar{p}}$. When considering multiple agents, a simple approach is to consider all the agents as many pairwise interactions. For $i=\{1, \ldots, n\}$ other agents, let $d_i=(x_e-x_i)$, $H_{T,i}(d_i, \dot{x}_i)$ be the threshold between two agents, and $H_{c,i}$ be the collision cost. The risk level set is $L_{\bar{p}}$ can then be expressed as the intersection of all pairwise level sets, $$L_{\bar{p}} = \bigcap_{i=1}^{n} L_{\bar{p},i} \quad \text{(Eq. 9)}$$

where $L_{\bar{p},i}$ is defined in (2). When defined in this fashion, Corollary 1 extends the claims of Theorem 1 to the multi-agent scenario.

Corollary 1 For a planning agent $x_e$ and a group of n agents with positions $x_i$, let $L_{\bar{p}}$ represent planning set of agent $x_e$. By planning within $L_{\bar{p}}$, agent $x_e$ avoids collisions with all other n agents in the environment.

Proof.

By construction, $L_{\bar{p}}$ is the intersection of all pairwise risk sets. For a point q to be in this set, the individual agent cost $H_i(q-x_i, \dot{x}_i)<H_T$. By Theorem 1, when the planning agent plans within this risk threshold, the maximum pairwise cost will never exceed $H_{c,i}$, ensuring the planning agent does not collide with the agent $x_i$. With this pairwise approach, the planning agent avoids collisions with all agents.

Figure 7:
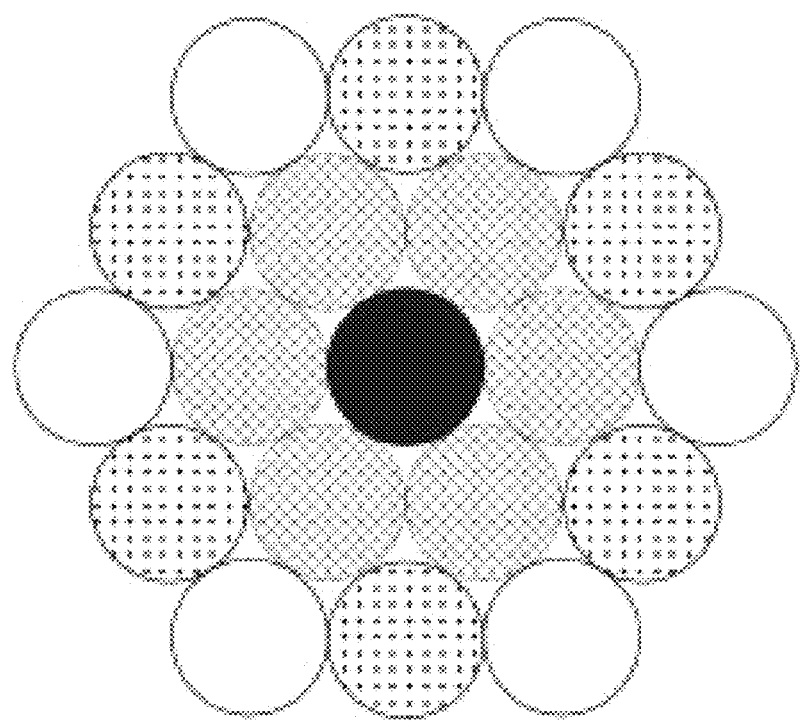
FIG. 7 is a diagram illustrating an example of a hexagonal packing pattern, according to aspects of the disclosure.

While Corollary 1 demonstrates a method for avoiding collisions in a pairwise fashion, to compute $L_{\bar{p}}$ as the intersection of all individual sets becomes intractable with many agents. Instead, it may be desirable to compute a single cost across the environment, and find a single risk level set within that cost. Consider the cost as the sum of all agents in the environment. Let $$H = \sum_{i=1}^{n} H_i(d_i, \dot{x}_i) = \sum_{i=1}^{n} \frac{\exp(-d_i^T \Omega d_i)}{1+\exp(-\alpha \dot{x}_i^T d_i)}, \quad \text{(Eq. 10)}$$

where n is the number of other agents in the field, and $d_i=(x_e-x_i)$, the pairwise distance between the planning agent $x_e$ and other agent X. Here, it is assumed that $\Omega$, $\alpha$, $v_{max}$, and the collision radius $r_c$ are equal for all agents in the group. From the assumption that all agents have the same safety radius, it can be shown that the level set of cost can be determined from a circle-packing problem. It turns out that for all agents with safety radius $r_c$, the hexagonal packing pattern is the densest arrangement of agents. In this pattern, at most six other agents of radius $r_c$ are positioned around the planning agent, and another twelve agents are arranged within $2r_c$ distance from the planning agent, as illustrated in FIG. 7.

From this hexagonal pattern, the maximum cost $H_c$ can be approximated which planning agent may encounter, based on a worst-case scenario of all agents packed together. It can be found that:

$$H_c \approx \quad \text{(Eq. 11)}$$

$$\sum_{i=1}^{6} \frac{\exp\left(-\dfrac{r_c^2}{\sigma_m^2}\right)}{1+\exp(-\alpha v_{max}r_c)} + \sum_{i=7}^{12} \frac{\exp\left(-\dfrac{(1.5r_c)^2}{\sigma_m^2}\right)}{1+\exp(-1.5\alpha v_{max}r_c)} +$$

$$\sum_{i=13}^{18} \frac{\exp\left(-\dfrac{(2r_c)^2}{\sigma_m^2}\right)}{1+\exp(-2\alpha v_{max}r_c)} + \ldots$$

In this summation, six agents are arranged at $r_c$, shaded with a crosshatch in FIG. 7. Six more agents are a distance $1.5r_c$, shaded with dots, and six agents are a distance $2r_c$ away, shown in white in FIG. 7. This calculation can be extended by adding more agents around the planning agent in the hexagonal pattern. Note the approximation of $H_c$ is determined by the number of agents and the packing density. For practical purposes in highly-cluttered environments, $H_c$ may be approximated by a fixed number of agents. Similarly, we can approximate $H_T$ from (Eq. 6) for multiple agents as $$H_T \approx \sum_{i=1}^{6} \frac{\exp\left(-\dfrac{R_b^2}{\sigma_u^2}\right)}{2} + \quad \text{(Eq. 12)}$$

$$\sum_{i=7}^{12} \frac{\exp\left(-\dfrac{(1.5R_b)^2}{\sigma_m^2}\right)}{2} + \sum_{i=13}^{18} \frac{\exp\left(-\dfrac{(2R_b)^2}{\sigma_m^2}\right)}{2} + \ldots$$

For planning purposes, approximating $H_T$ by truncating the series expansion will yield a more conservative estimate. For example, letting $$H_P \le \frac{3\exp\left(-\frac{R_b^2}{\sigma_u^2}\right)}{2}$$

will guarantee that $H_P < H_T$ for any group size of $n \ge 6$ other agents in the environment.

Figure 1A:
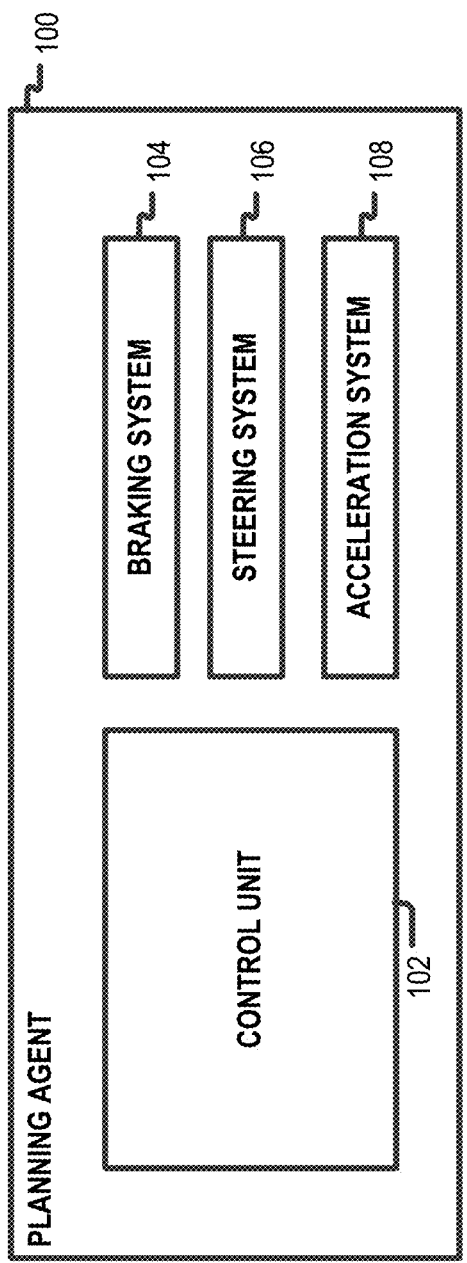
FIG. 1A is a diagram of an example of a planning agent, according to aspects of the disclosure.

Referring now to FIG. 1A, an example of a planning agent 100 includes a control unit 102 operatively coupled to a braking system 104, a steering system 106, and an acceleration system 108. In some implementations, the planning agent 100 may be arranged to travel (e.g. drive) from one point to another without (or with limited) input from a human driver. According to the present example, the planning agent 100 is an automobile. However, alternative implementations are possible in which the planning agent 100 is a truck, a motorcycle, a bus, a boat, an airplane, a helicopter, a lawnmower, a recreational vehicle, an amusement park vehicle, farm equipment, construction equipment, a tram, a golf cart, a train, a trolley, a glider, warehouse equipment, factory equipment, a wheelchair, a mobility assistance, and/or any other suitable type of device or system (i.e., planning agent (or any agent) may be any land, water or air-based vehicle or any machinery or other equipment capable of being controlled).

Control unit 102 may include one or more computing systems for controlling the operation of the planning agent 100. The control unit 102 may be configured to interact with the braking system 104, the steering system 106, and the acceleration system 108 to cause the planning agent 100 to slow down, stop, steer, or accelerate by providing appropriate control signals. The steering system 106 may include any suitable type of system that is capable of causing the planning agent to change its traveling direction. For example, the steering system 106 may include a rack-and-pinion steering system or a warm-and-roller steering system. Additionally or alternatively, in some implementations (e.g., in instances in which the planning agent 100 is a wheelchair), the steering system may be implemented by changing the speed at which different wheels of the planning agent turn. The acceleration system 106 may include any suitable type of system that can cause the planning agent to accelerate. For example, the acceleration system 106 may include one or more actuators (e.g., engines, motors, etc.) that are part of the planning agent 100, throttle control, etc.

Figure 1B:
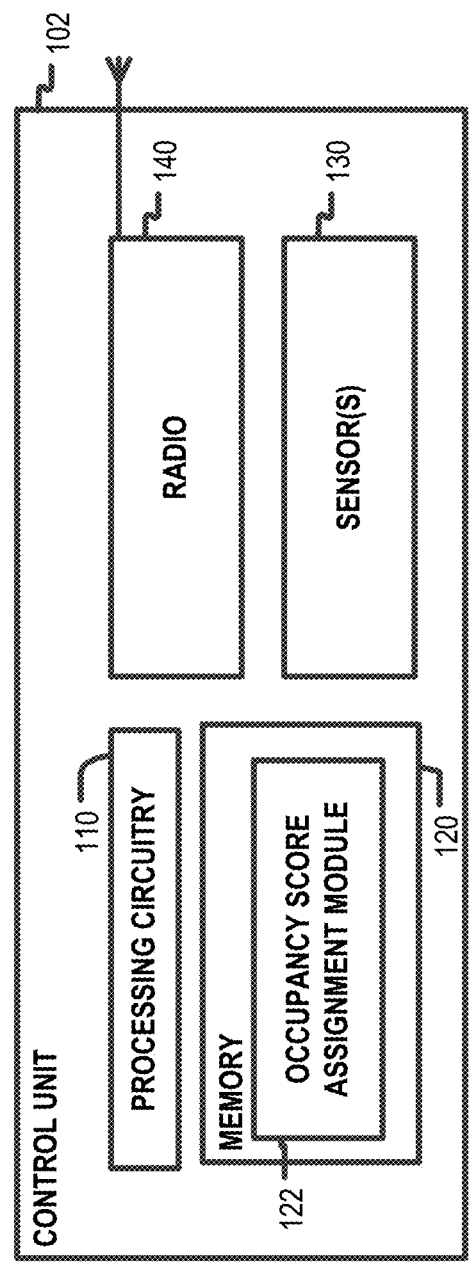
FIG. 1B is a diagram of a control unit of FIG. 1A, according to aspects of the disclosure.

Referring now to FIG. 1B, an illustrative control unit 102 includes processing circuitry 110 operatively coupled to a memory 120, sensors 130, and a radio 140. The processing circuitry 110 may include one or more general purpose processors (e.g., ARM-based processors), one or more Application-Specific Integrated Circuits (FPGAs), a Field-Programmable Gate Array (FPGA), and/or any other suitable type of processing circuitry. The memory 120 may include any suitable type of volatile and/or non-volatile memory. In some implementations, the memory 120 may include a random access memory (RAM), a Solid-State Drive (SSD), a flash memory, a hard disk (HD), a flash memory, etc.

The sensor(s) 130 may include one or more of a microphone, a camera, sensor for detecting pitch, yaw, or roll of the planning agent 100, a laser scanner, a sonar, a RADAR, a LIDAR, and/or any other suitable type of device for detecting obstacles and/or other vehicles on the road. In some implementations, any of the sensors(s) 130 may be arranged to provide the processing circuitry 110 with signals that identify one or more characteristics of at least one neighboring agent that is situated in the vicinity of the planning agent 100. For example, such characteristics may include: (i) the location of the neighboring agent, speed of travel of the neighboring agent, direction of travel of the neighboring agent, acceleration of the neighboring agent, physical dimensions of the neighboring agent (e.g., length, width, and height), type of the neighboring agent (e.g., SUV, car, truck, emergency vehicle, etc.), braking distance of the neighboring agent, etc. Additionally or alternatively, in some implementations, the any of the sensor(s) 130 may be arranged to generate signals that identify one or more characteristics of the environment across which the planning agent 100 is traveling. For example, such characteristics may include: (i) type of surface on which the planning agent is traveling, (ii) slope of the surface on which the traveling agent is traveling (e.g., is the planning agent traveling uphill, downhill, or on an approximately level surface), (iii) visibility in the environment in which the planning agent is traveling, etc.

The radio 140 may be a 802.11 transceiver, a 4G or 5G transceiver, a communication unit for inter-vehicle communication, or any other type of transceiver for receiving and transmitting information. In some implementations, the radio 140 may be used by the processing circuitry 110 to receive indications of various characteristics of at least one neighboring agent that is situated in the vicinity of the planning agent 100. For example, such characteristics may include: (i) the location of the neighboring agent, speed of travel of the neighboring agent, direction of travel of the neighboring agent, acceleration of the neighboring agent, physical dimensions of the neighboring agent (e.g., length, width, and height), type of the neighboring agent (e.g., SUV, car, truck, emergency vehicle, etc.), braking distance of the neighboring agent, etc. In some implementations, the indications of the characteristics may be transmitted by the neighboring agent via a protocol for inter-vehicle communication. Additionally or alternatively, in some implementations, the radio 140 may be used by the processing circuitry 110 to receive indications of one or more characteristics of the environment across which the planning agent 100 is traveling. For example, such characteristics may include: (i) type of surface on which the planning agent 100 is traveling, (ii) slope of the surface on which the planning agent 100 is traveling (e.g., is the planning agent traveling uphill, downhill, or on an approximately level surface), (iii) visibility in the environment in which the planning agent 100 is traveling, (iv) condition of the surface on which the planning agent is traveling (e.g., wet or dry), etc. In some implementations, the indication(s) of characteristics of the environment across which the planning agent 100 is traveling may be transmitted by neighboring agents using a protocol for inter-vehicle communication. Additionally or alternatively, the indication(s) of characteristics of the environment across which the planning agent 100 is traveling may be transmitted by a centralized server.

Although FIG. 1B depicts the control unit 102 as a monolithic unit, it will be understood that the control unit 102 may be a distributed system comprising a plurality of control units 102 that are integrated into different systems of the planning agent 100 and connected to one another via at least one communications bus and/or another communications channel. For example, in some implementations, the processing circuitry 210 may include a first control unit that is integrated into the braking system 104, a second control unit that is integrated into the steering system 106, and a third control unit that is integrated into the acceleration system 108, for example. In this regard, in some implementations, the processing circuitry 110 may include one or more of a processing circuitry that is part of a first one of the sensors 130 (e.g., a LIDAR), a processing circuitry that is part of a second one of the sensors 130 (e.g., a RADAR), a processing circuitry that is part of a Bluetooth interface (or another communications interface), etc. Stated succinctly, the present disclosure is not limited to any specific implementation of the control unit 102.

According to the present example, the control unit 102 may store an occupancy score assignment module 122. According to the present example, the occupancy score assignment module 122 includes one or more processor executable instructions, which when executed by the processing circuitry 110 causes the processing circuitry 110 to execute a model for assigning risk-score coefficients. The executed model may be the same or similar to the model described above. In some implementations, the model may be executed in accordance with the process(es) as discussed further below with respect to FIGS. 2A-7. Although in the present example the occupancy score assignment module 122 is implemented in software, alternative implementations are possible in which the occupancy score assignment module 122 is implemented in hardware, or as a combination of hardware and software. In this regard, it will be understood, that the present disclosure is not limited to any specific implementation of the module 122.

Figure 2:
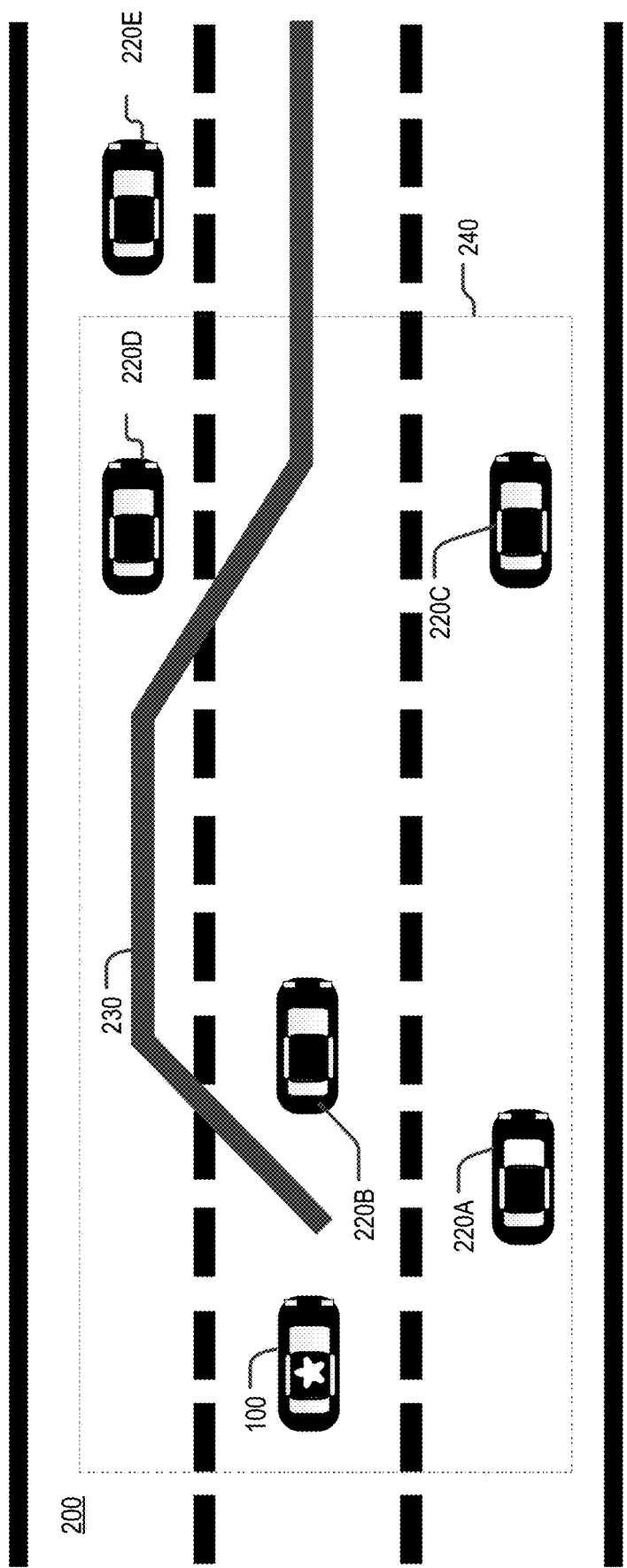
FIG. 2 is a diagram illustrating the operation of the planning agent of FIG. 1A, according to aspects of the disclosure.

FIG. 2 is a diagram illustrating the operation of the planning agent 100, according to aspects of the disclosure. As illustrated, in the present example, the planning agent 100 is traveling across a road 200. Present on the road 200 is a cluster of neighboring agents 220 that congest the road 200. The planning agent 100 is configured to bypass the cluster of neighboring agents 220 by following a traveling path 230, as shown. To determine and follow the traveling path 230, the planning agent may execute a control sequence that is implemented, at least in part, by using the occupancy score assignment module 122. In some implementations, the control sequence may include at least three stages. The first stage may include calculating a plurality of pairwise sets of occupancy costs (e.g., see FIG. 3) for the neighboring agents 220 that are situated within a planning horizon of the planning agent 100 (e.g., the neighboring agents 220A-D). The manner in which the planning horizon is selected/established will be described below. The second stage may include consolidating the pairwise occupancy costs to produce a combined set of occupancy costs (e.g., see FIGS. 4A-B). And the third stage may include determining a travel path for the planning agent 100 based on the combined set of occupancy costs (e.g., see FIGS. 5A-6B). Additionally or alternatively, in some implementations, the control sequence may include at least two stages. The first stage may include calculating a combined set of occupancy costs directly, without calculating pairwise sets first (e.g., see FIGS. 4A-B). And the second stage may include determining a travel path for the planning agent 100 based on the combined set of occupancy costs (e.g., see FIGS. 5A-6B).

The planning horizon 240 may include any portion of the environment across which the planning agent 100 is traveling. In some implementations, the planning horizon 240 of the planning agent 100 may include an area that extends a first pre-selected distance (e.g., 10 m) ahead of the planning agent 100, a second distance (e.g., 10 m or 7 m) behind the planning agent 100, and a third distance (e.g., 10 m or 1 m) to the sides of the planning agent 100. Any of two of the first, second, and third distances may be the same or different. In some implementations, the exact dimensions of the planning horizon 240 may depend on the range of one or more sensor(s) 130 that are part of the planning agent 100.

Although in the present example, the neighboring agents 220 are road vehicles, alternative implementations are possible in which the neighboring agents 220 include another type of agent. In such instances, any of the neighboring agents may include a person (e.g., a pedestrian), an animal (e.g., wildlife on the side of the road), and or any other moving object in the vicinity of the planning agent 100. As another example, when the planning agent 100 is a wheelchair or another type of mobility aid device, one or more of the neighboring agents 220 may be people or pets located in the same room as the planning agent 100. Although in the present example, the neighboring agents 220 move in parallel directions, it will be understood that in some implementations, any two of the neighboring agents 220 may move in directions that are opposite to one another or transverse.

Figure 3A:
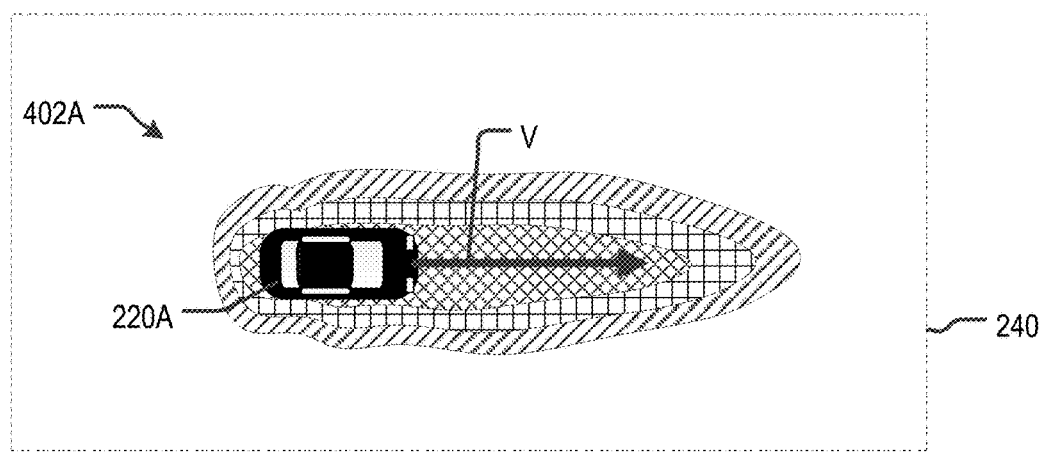
FIG. 3A is a diagram illustrating an example of a pairwise set of occupancy costs that is associated with the planning agent of FIG. 1A, according to aspects of the disclosure.
Figure 3B:
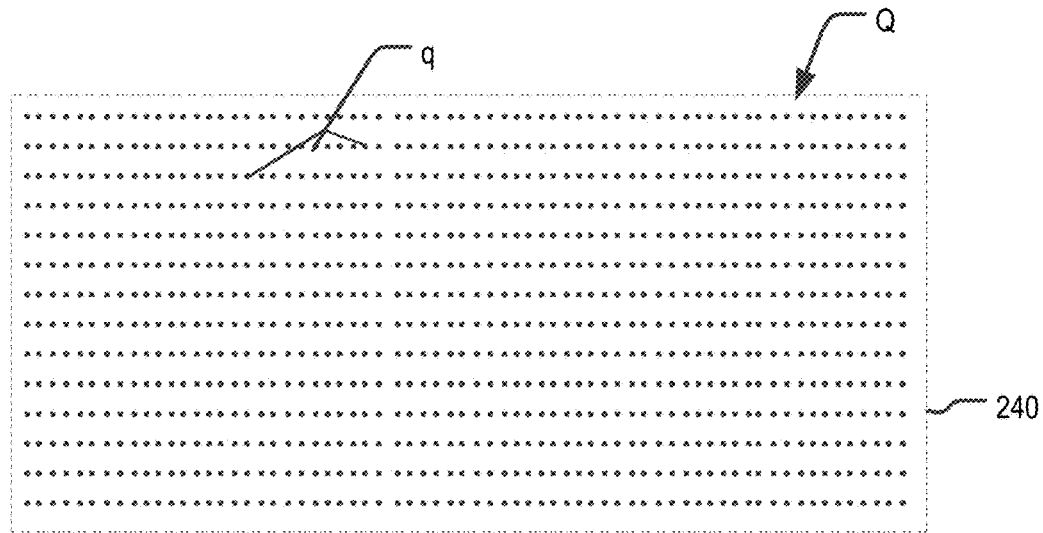
FIG. 3B is a diagram illustrating a plurality of locations within a planning horizon of the planning agent of FIG. 1A that are associated with the pairwise set of occupancy costs of FIG. 3A, according to aspects of the disclosure.
Figure 3C:
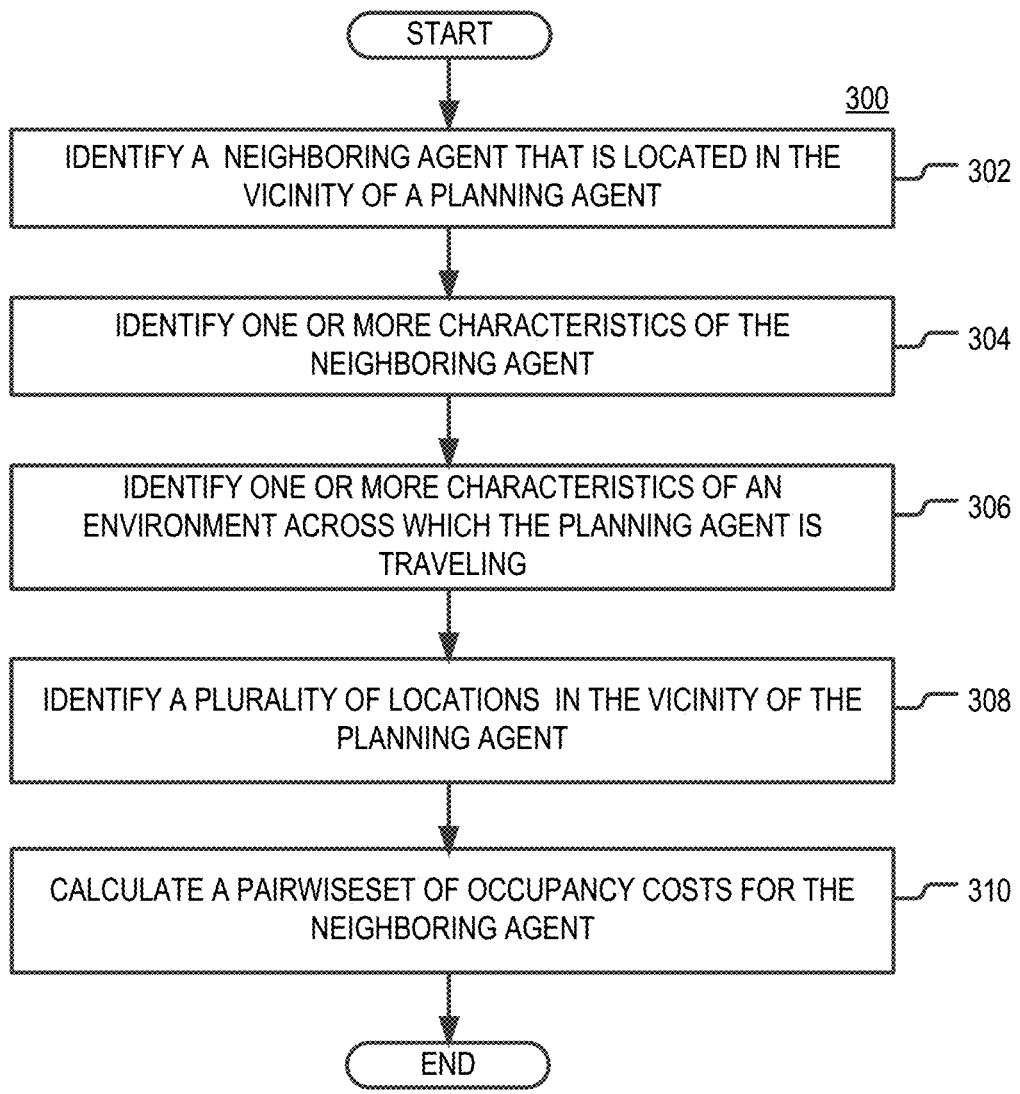
FIG. 3C is a flowchart of an example of a process for calculating the pairwise set of occupancy costs of FIG. 3A, according to aspects of the disclosure.

FIGS. 3A-C illustrate an example of a process 300 for calculating or otherwise determining or receiving a pairwise set 402A of occupancy costs for the neighboring agent 220A, according to aspects of the disclosure. As used throughout the disclosure, the term "pairwise set of occupancy costs" refers to a set of occupancy costs that are calculated based upon characteristics of only one of the neighboring agents 220 and/or the neighboring agent 220, without taking characteristics of other ones of the neighboring agents 220.

Each occupancy cost in the pairwise set 402A of occupancy costs may be associated with a particular location in the planning horizon 240 of the planning agent 100, and it may quantify a probability of the planning agent 100 colliding with the neighboring agent 220A if the planning agent 100 were to move in that location. According to the example of FIG. 3, the pairwise set 402A of occupancy costs is calculated with respect to the neighboring agent 220A. However, it will be understood that the respective set of pairwise occupancy costs for any of the remaining neighboring agents 220B-D can be calculated in the same or similar manner.

At step 302, the planning agent 100 identifies a neighboring agent 220 that is located in the vicinity of the planning agent 100. According to the present example, a neighboring agent 100 is considered to be in the vicinity of the planning agent 100 when the planning agent is situated within the planning horizon 240 of the planning agent. The neighboring agents may be identified using RADAR, LIDAR, and/or any other suitable type of technology. In the present example, the neighboring agent 220A is identified at step 302.

At step 304, the planning agent 100 identifies one or more characteristics the neighboring agent 220A. For example, the identified characteristics may include one or more of (i) the location of the neighboring agent 220A, speed of travel of the neighboring agent, direction of travel of the neighboring agent 220A, acceleration of the neighboring agent 220A, physical dimensions of the neighboring agent 220A (e.g., length, width, and height), type of the neighboring agent 220A (e.g., SUV, car, truck, emergency vehicle, etc.), braking distance of the neighboring agent 220A, etc. As noted above, the characteristics may be obtained by the planning agent 100 by using the sensor(s) 130 and/or the radio 140.

At step 306, one or more characteristics are determined of the environment across which the planning agent 100 is traveling. For example, the characteristics may include one or more of: (i) type of surface on which the planning agent is traveling, (ii) slope of the surface on which the traveling agent is traveling (e.g., is the planning agent traveling uphill, downhill, or on an approximately level surface), (iii) visibility in the environment in which the planning agent is traveling, (iv) condition of the surface on which the planning agent is traveling (e.g., wet or dry), etc. As noted above, the characteristics may be obtained by the planning agent 100 by using the sensor(s) 130 and/or the radio 140.

At step 308, a plurality of locations is identified in the vicinity of the planning agent 100. According to the present example, identifying a plurality of locations in the vicinity of the planning agent 100 includes identifying a set of locations Q, wherein each location q that is part of the set Q is situated within the planning horizon 240 of the planning agent 100. According to the present example, each location q may be represented in terms that are relative to the current position of the planning agent 100. In this regard, in some implementations, each location q may be represented using a coordinate system in which the planning agent 100 is at the origin. The locations q may be spaced at any suitable pitch. For example, in some implementations, the locations q may be 0.15 m apart, 0.3 m apart, 1 m apart, etc.

At step 310, the pairwise set 402A of occupancy costs for the neighboring agent 220A is calculated by the planning agent 100. Each of the coefficients in the pairwise set 402 of locations is associated with a different location q in the set Q, and it represents the likelihood of the planning agent 100 of colliding with the neighboring agent 220A if the planning agent 100 were to move in the location q. Each coefficient in the set of pairwise occupancy costs may be calculated using Equation 20 below:

$$H = \frac{\exp(-(q-x_i)^T \Omega (q-x_i))}{1 + \exp(-\alpha \dot{x}_i^T (q-x_i))} \quad \text{(Eq. 13)}$$

$$\Omega = \text{diag}\left\{\frac{1}{\sigma_x^2}, \frac{1}{\sigma_y^2}\right\}. \quad \text{(Eq. 14)}$$

where H is AN occupancy cost, q is the location on the road 200 for which the occupancy cost is calculated, σ is a standard deviation, x is the location of the neighboring agent 220A, $\dot{x}_i$ is the velocity vector of the neighboring agent 220A, and a is a rate of change of a cost function that is constituted by the denominator of Eq. 13. In some implementations, the value of σ may be selected based on an uncertainty measurement of the planning agent. For example, in some implementations, the value of σ may be selected to account for any uncertainty that is present in sensor readings used by the planning agent 100 to measure the speed and location of the neighboring agent 220A. Additionally or alternatively, in some implementations, the value of σ may be selected based on the one or more physical dimensions of the neighboring agent 220A (e.g., the width of the neighboring agent 220A, the height of the neighboring agent 220A, and the length of the neighboring agent 220A). In some implementations, the rate of change σ may be based on one or more characteristics of the neighboring agent 220A or the environment across which the planning agent 100 is traveling, which impact the minimum safe distance at which the planning agent 100 can travel behind the neighboring agent 220A. Such characteristics may include the speed of the neighboring agent 220A, the type of the neighboring agent (e.g., an SUV, a sedan, a pickup truck, a freight truck, etc.), the braking distance of the planning agent 100, the slope of the road 200, and/or the condition of the road (e.g., dry, wet, frozen, etc.).

According to the present example, the numerator of Equation 20 [i.e., $\exp(-(q-x_i)^T \Omega (q-x_i))$] is a Gaussian peak function. The Gaussian peak function represents an estimate of the current position of the neighboring agent 220A. Applying the Gaussian peak function alone would result in a set of occupancy costs being produced that has a Gaussian distribution that is symmetrical with respect to the neighboring agent 220A.

According to the present example, the denominator of Equation 2 [i.e., $1+\exp(-\alpha \dot{x}_i^T (q-x_i))$] is a cost function (e.g., a logistic function). The cost function skews the distribution that would be otherwise produced by the Gaussian peak function in the direction of the velocity of the neighboring agent 220A. In some aspects, applying the cost function, causes values calculated by the Gaussian distribution function, for locations behind and on the sides of the vehicle, to be reduced to arrive at occupancy costs for those locations. Furthermore, applying the logistics function, causes values calculated by the Gaussian distribution function, for locations ahead of the vehicle, to be increased to arrive at occupancy costs for those locations. In other words, applying the logistic function causes the pairwise occupancy cost set to assume the "elongated shape," which is seen in FIG. 3.

Figure 4B:
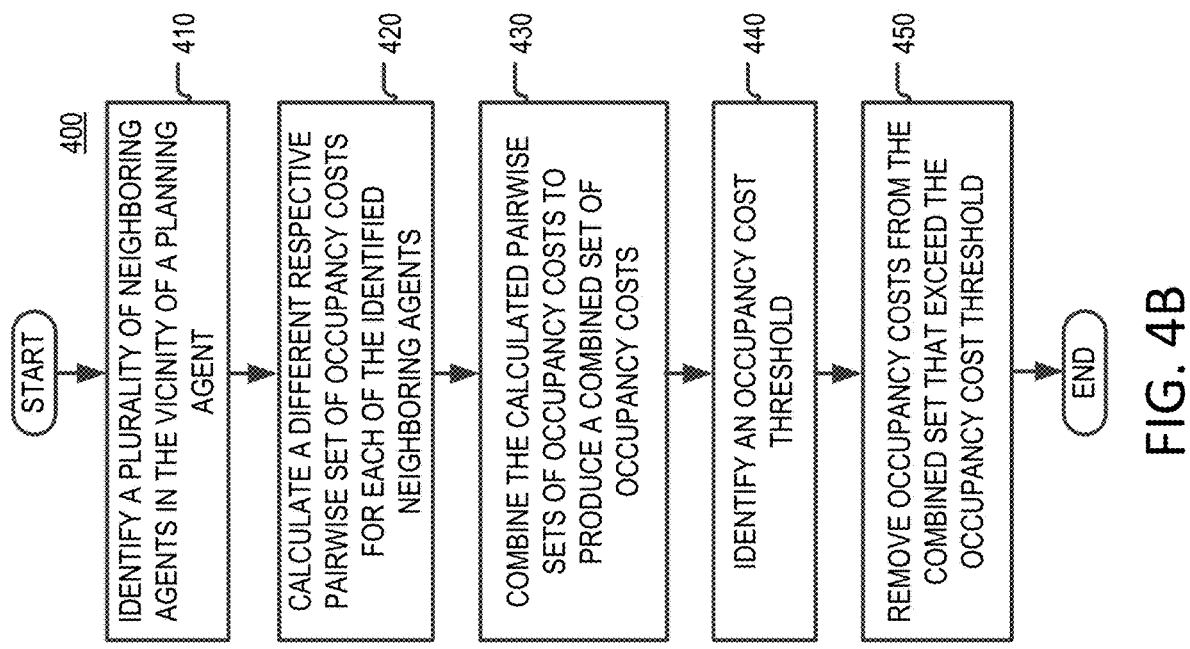
FIG. 4B is a flowchart of an example of a process for calculating the occupancy cost set of FIG. 4A, according to aspects of the disclosure.
Figure 4A:
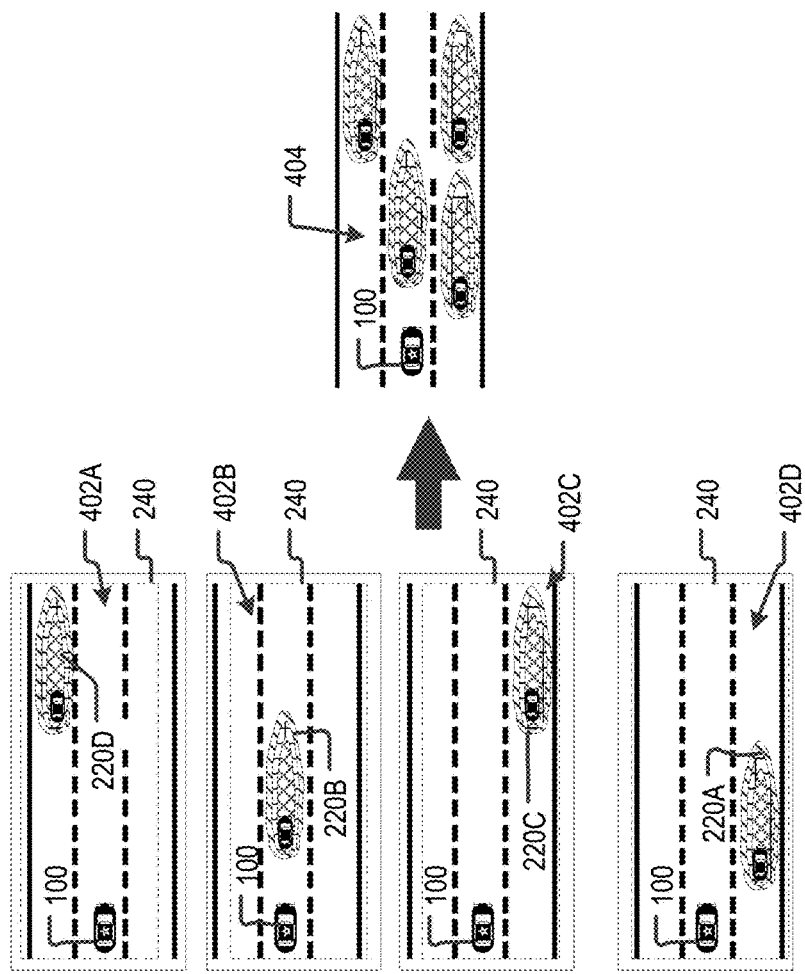
FIG. 4A is a diagram illustrating an example of a set of occupancy costs that is generated by combining different pairwise occupancy cost sets, according to aspects of the disclosure.

FIGS. 4A-B illustrate an example of a process 400 for calculating a combined set 404 of occupancy costs. In some implementations, the term "combined set of occupancy costs" may refer to a set of occupancy costs that are calculated based on characteristics of all neighboring agents within the planning horizon 240 of the planning agent 100. Each occupancy cost in the combined set 404 may be associated with a particular location in the planning horizon 240 of the planning agent 100, and it may quantify a probability of the planning agent 100 colliding with any of the neighboring agent in the planning horizon 240 if the planning agent 100 were to move in that location.

At step 410, the planning agent 100 detects a plurality of neighboring agents 220 that are located in the vicinity of the planning agent 100. According to the present example, a neighboring agent is considered to be in the vicinity of the planning agent 100 when the neighboring agent is located within the planning horizon 240 of the planning agent 100. According to the present example, the neighboring agents 220A-D are identified as a result of executing step 410.

At step 420, the planning agent 100 calculates a different pairwise set 402 of occupancy costs for each of the neighboring agents 220. More particularly, at step 420 the planning agent 100 calculates the pairwise set 402A of occupancy costs for the neighboring agent 220A; a pairwise set 402B of occupancy costs for the neighboring agent 220B; a pairwise set 402C of occupancy costs for the neighboring agent 220C; and a pairwise set 402D of occupancy costs for the neighboring agent 220D. Each of the pairwise sets 402 of occupancy costs may be calculated in accordance with the process 300, which is discussed above with respect to FIGS. 3A-C. Each of the coefficients in any given one of the pairwise sets 402 may be associated with a different respective location q in the set of locations Q. In some respects, any of the coefficients in each of the pairwise sets 402 of occupancy costs may represent the likelihood of the planning agent colliding with the set's 402 respective neighboring agent 220, if the planning agent 100 were to move in the coefficient's respective location q.

At step 430, the pairwise sets 402 of occupancy costs are combined to produce a combined set 404 of occupancy costs. Combining the sets 402 may include identifying, for each of the locations q in the set Q, the largest occupancy cost that is part of any of the pairwise sets 402, and including the largest occupancy cost in the combined set 404. For example, if the pairwise sets 402A-D include coefficients 0.3, 0.4, 0.6, and 0.7, respectively, for location $q_1$ in the set of locations Q, the coefficient having a value of 0.7 may be assigned to location $q_1$ in the combined set 404 of the occupancy costs. As another example, if the pairwise sets 402A-D include coefficients 0.2, 0.8, 0.1, and 0.7, respectively, for location $q_2$ in the set of locations Q, the coefficient having a value of 0.8 may be assigned to location $q_2$ in the combined set 404 of occupancy costs. In some implementations, the combined set of occupancy costs may be calculated by taking the union of the pairwise sets 402 of occupancy costs in accordance with Equation 9 above.

At step 440, an occupancy cost threshold is identified. In some implementations, the occupancy cost threshold may be greater than or equal to the threshold $H_C$, which is discussed with respect to Theorem 1. In some respects, the threshold $H_C$ may represent an occupancy cost value at which collision between the planning agent 100 and another agent is considered very likely to occur if the planning agent 100 were to move into a position (e.g., a vacant region or a location) associated with the occupancy cost. In some implementations, the occupancy cost threshold may be greater than or equal to the threshold $H_T$, which is discussed with respect to Lemma 2. In some respects, the threshold $H_T$ may represent a minimum occupancy cost value for which it is considered safe for the planning agent 100 to move into a position (e.g., a vacant region or a location) associated with the occupancy cost. Although in the present example, the thresholds $H_T$ and $H_C$ are provided as examples of occupancy cost thresholds, it will be understood that the present disclosure is not limited to any specific method for determining the occupancy cost threshold, as the value of the occupancy cost threshold may vary in accordance with the application served by the planning agent. For example in some implementations, the risk cost threshold may be determined based on the braking distance of one or more of the neighboring agents 220 or characteristics that affect (or can otherwise serve as a proxy of) the braking distance of one or more of the neighboring agents 220, such as: (i) the weight of any of the neighboring agents, (ii) the speed of any of the neighboring agents (iii), (iv) the slope of the road 200, the type of surface of the road 200, (v) the condition of the road surface (e.g., wet, dry, etc.). As noted above, such metrics may be obtained by the planning agent 100 by using the sensor(s) 130 and/or the radio 140.

At step 450, occupancy costs in the combined set 404 that exceed the occupancy cost threshold are removed from the combined set 404, and the process 400 is terminated.

In the example of FIGS. 4A-B, the combined set 404 of occupancy costs is calculated by performing steps 410-430. However, in some implementations, steps 410-430 may be omitted and replaced with a single step in which the combined set 404 is calculated directly, without calculating pairwise sets 402 beforehand. Using this approach may be advantageous in situations in which calculating pairwise sets of risk cost coefficients is not practical due to a large number of neighboring agents being present within the planning horizon 240. In such implementations, the combined set 404 of occupancy costs may be calculated using previously-discussed Equations 2 and 14:

$$H(q, x, \dot{x}) = \sum_{i=1}^{n} \frac{\exp(-(q-x_i)^T \Omega(q-x_i))}{1 + \exp(-\alpha \dot{x}_i^T (q-x_i))} \quad \text{(Eq. 2)}$$

$$\Omega = \text{diag}\left\{\frac{1}{\sigma_x^2}, \frac{1}{\sigma_y^2}\right\}, \quad \text{(Eq. 14)}$$

where n is the total number of neighboring agents identified at step 410, σ is a standard deviation, and $\dot{x}_i$ is the velocity vector of neighboring agent i, $x_i$ is the location of neighboring agent i, and α is a rate of change of a cost function that is constituted by the denominator of Eq. 2. In some implementations, the location $x_i$ may be calculated in relation to the planning agent 100 (e.g., by using a coordinate system having the planning agent 100 at its origin). In some implementations, the value of σ may be selected based on an uncertainty measurement of the planning agent. For example, in some implementations, the value of a may be selected to account for any uncertainty that is present in sensor readings used by the planning agent 100 to measure the speed and location of the neighboring agent 220A. Additionally or alternatively, in some implementations, the value of σ may be selected based on the one or more physical dimensions of one or more the neighboring agents.

In some implementations, the rate of change a may be based on one or more characteristics of the neighboring agents 220 or the environment across which the planning agent 100 is traveling, which impact the minimum safe distance at which the planning agent 100 can travel behind the neighboring agent 220. Such characteristics may include the speed of one or more of the neighboring agents 220, the type of one or more of the neighboring agents 200 (e.g., an SUV, a sedan, a pickup truck, a freight truck, etc.), the braking distance of the planning agent 100, the slope of the road 200, and/or the condition of the road (e.g., dry, wet, frozen, etc.). As illustrated, Equation 2 is essentially a summation of Equation 13. In this regard, as noted above, the numerator of Equation 2 [i.e., $\exp(-(q-x_i)^T \Omega(q-x_i))$] is a Gaussian peak function and the denominator of Equation 2 [i.e., $1+\exp(-\alpha \dot{x}_i^T(q-x_i))$] is a cost function (e.g., a logistic function), which skews the distribution that would be otherwise produced by the Gaussian peak function in the direction of velocity of individual neighboring agents, as shown in FIG. 4A.

In the example of FIGS. 4A-B, the combined set 404 is modified at steps 440-450 to exclude occupancy costs that are above an occupancy cost threshold. However, alternative implementations are possible in which steps 440-450 are omitted. In such instances, the occupancy cost threshold and how the values of individual occupancy costs compare to the occupancy cost threshold may be taken into consideration during the planning stages of the control sequence of the planning agent 100.

Figure 5B:
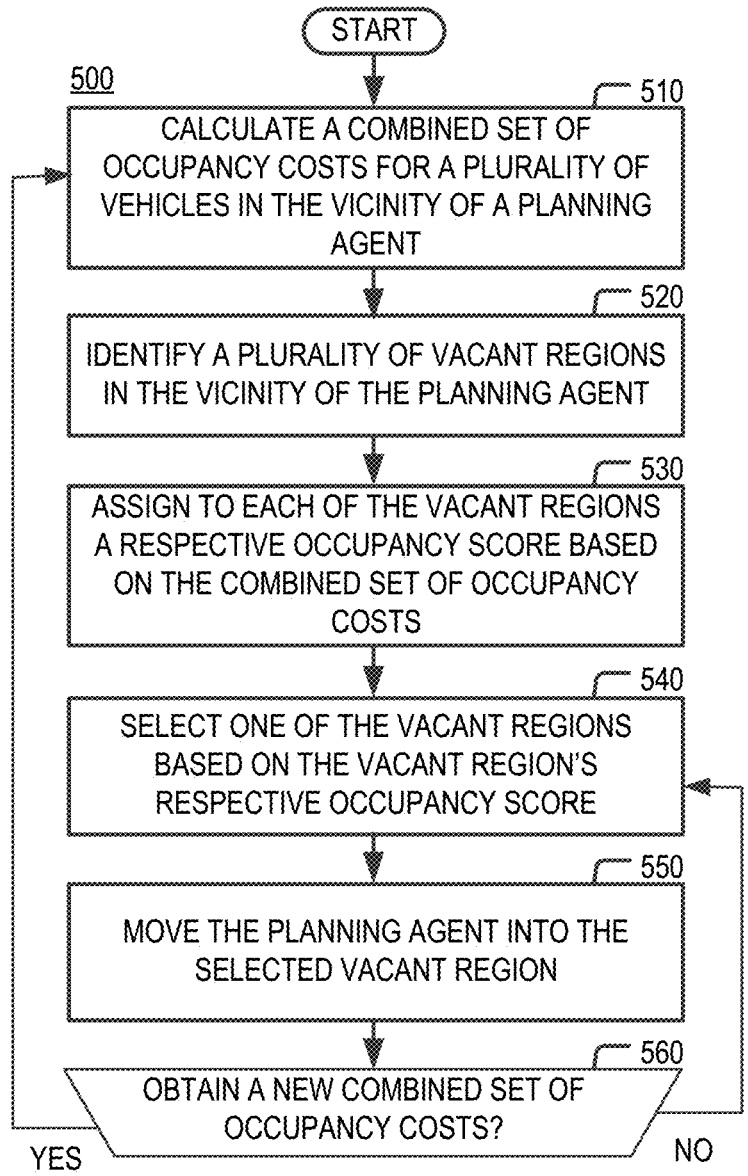
FIG. 5B is a flowchart of the process of FIG. 5A for navigating a planning agent based on a set of occupancy costs, according to aspects of the disclosure.

FIGS. 5A-B show an example of a process 500 for changing the speed and/or direction of a planning agent based on a combined set of occupancy costs, according to aspects of the disclosure.

At step 510, a combined set of occupancy costs is calculated for a plurality of neighboring agents in the vicinity of the planning agent 100. In some implementations, the combined set of occupancy costs may be calculated based on a plurality of pairwise sets of risk cost coefficients, as discussed above with respect to FIGS. 4A-B. Additionally or alternatively, in some implementations, the combined set of risk cost coefficients may be calculated directly, as discussed above with respect to Equation 2. According to the present example, the combined set 404 of occupancy costs for the neighboring agents 220 is calculated as a result of executing step 510.

At step 520, a plurality of vacant regions 502 in the vicinity of the planning agent 100 is identified. According to the present example, each of the plurality of vacant regions 502 is located within the planning horizon 240 of the planning agent 100. Each of the vacant regions 502 may be a portion of the road 200 that is large enough to receive the planning agent 100, should the planning agent 100 decide to move in it. As such, each of the vacant regions 502 may have a width that is greater than or equal to the width of the planning agent 100, and a length that is greater than or equal to the length of the planning agent 100. In some implementations, the vacant regions 502 may be defined in terms that are relative to the position of the planning agent 100 (e.g., by using a coordinate system in which the current position of the planning agent 100 is at the origin).

At step 530, each of the vacant regions 502 is assigned a respective occupancy score based on the combined set 404 of occupancy costs. The respective occupancy score of any one of the given vacant regions 502 may be based on one or more occupancy costs from the set 404 that are associated with locations q' from the set Q, wherein each of the locations q' is situated within the given vacant region.

In some implementations, the set of risk cost coefficients may be generated such that only one respective occupancy cost is present for the location(s) in each of the vacant regions 502. In such instances, the respective occupancy score for each of the regions may be the same as the vacant regions corresponding occupancy cost.

In some implementations, the set of risk cost coefficients may be generated such that multiple occupancy costs are present for the location(s) in each of the vacant regions. In such implementations, assigning respective occupancy scores to the plurality of vacant regions 502 may include down-sampling the combined set 404 of occupancy costs to a resolution that matches the density and distribution of the vacant regions 502 within the planning horizon 240. By way of example, assigning a respective occupancy score to any of the vacant regions 502 may include: (i) identifying a plurality of locations within the vacant regions, (ii) identifying occupancy costs in the set 404 that are associated with the identified locations, and (iii) determining the value of the occupancy score based on the identified occupancy costs. In some implementations, determining the value of the occupancy score of the vacant regions 502 may include causing the occupancy score to be equal to the greatest occupancy cost among the identified occupancy costs. In some implementations, determining the value of the occupancy score of the vacant regions 502 may include causing the occupancy score to be equal to the average of the identified occupancy costs. Stated succinctly, the present disclosure is not limited to any specific method for assigning occupancy scores to the plurality of vacant regions 502 based on the combined set 404 of occupancy costs.

At step 540, the planning agent 100 selects one of the vacant regions 502 based on that region's respective occupancy score. According to the present example, the selected vacant region is one that is: (i) directly adjacent to the planning agent 100, (ii) has the lowest occupancy score among all vacant regions that are directly adjacent to the planning agent 100, and (iii) has an occupancy score that is below an occupancy cost threshold, such as the occupancy cost threshold discussed with respect to step 440 of the process 400. In some implementations, a given vacant region that is directly adjacent to the planning agent 100 may be one that is positioned next to the planning agent 100 such that there are no other vacant regions situated between the given vacant region and the planning agent 100. In the example of FIGS. 5A-B, the vacant regions 502a, 502b, and 502h are directly adjacent to the planning agent 100.

Although in the present example, the selected vacant region is directly adjacent to the planning agent 100, alternative implementations are possible in which the selected vacant region is not directly adjacent. Stated succinctly, the present disclosure is not limited to any specific method for selecting a vacant region based on one or more occupancy scores and/or the combined set 404 of occupancy costs. According to the present example, the vacant region 502B is selected as a result of executing step 540.

At step 550, the planning agent 100 is moved into the selected vacant region. Moving the planning agent 100 into the selected vacant region may include at least one of accelerating the planning agent 100 or changing the direction of travel of the planning agent. According to the present example, moving the planning agent 100 into the vacant region 502B includes both accelerating the planning agent 100 and changing the direction of travel of the planning agent 100.

At step 560, a determination is made whether to obtain a new combined set of occupancy costs. In some implementations, making the determination may include detecting whether a timer has expired and/or detecting whether a predetermined event has been generated in the control unit of the planning agent 100. If it is determined to obtain a new combined set of occupancy costs, the process 500 returns to step 510. Otherwise, if it is determined not to obtain a new combined set of reduced cost coefficients, the process 500 returns to step 540.

Figure 6A:
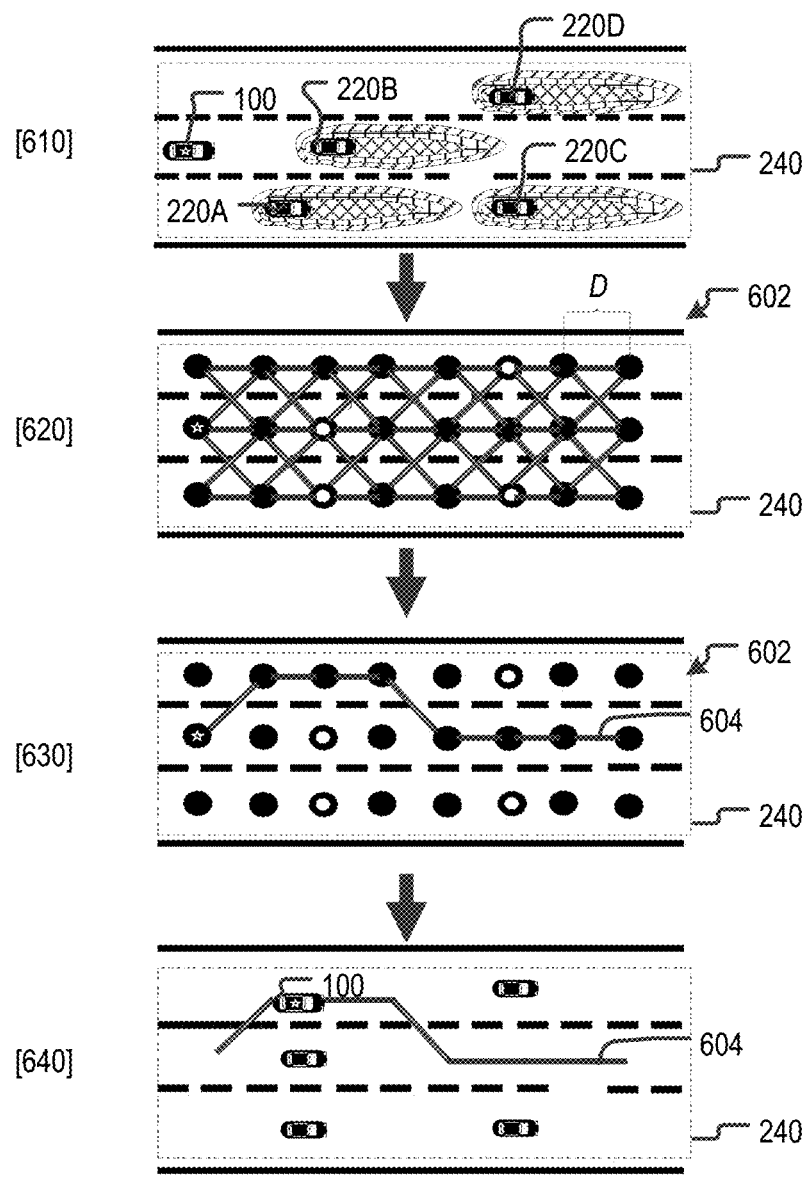
FIG. 6A is diagram illustrating the operation of another process for navigating a planning agent based on a set of occupancy costs, according to aspects of the disclosure.
Figure 6B:
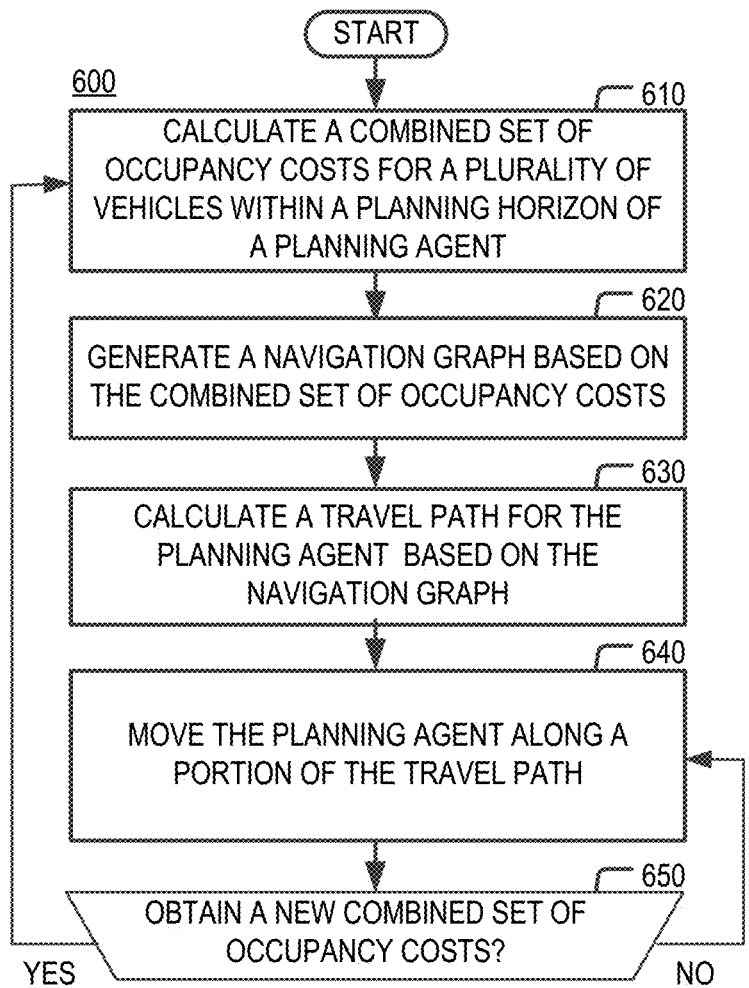
FIG. 6B is a flowchart of the process of FIG. 6A for navigating a planning agent based on a set of occupancy costs, according to aspects of the disclosure.

FIGS. 6A-B show an example of a process 500 for changing the speed and/or direction of a planning agent based on a combined set of occupancy costs, according to aspects of the disclosure.

At step 610, a combined set of occupancy costs is calculated for a plurality of neighboring agents in the vicinity of the planning agent 100. In some implementations, the combined set of occupancy costs may be calculated based on a plurality of pairwise sets of risk cost coefficients, as discussed above with respect to FIGS. 4A-B. Additionally or alternatively, in some implementations, the combined set of risk cost coefficients may be calculated directly, as discussed above with respect to Equation 2. According to the present example, the combined set 404 of occupancy costs for the neighboring agents 220 is calculated as a result of executing step 610.

At step 620, the planning agent 100 generates a graph 602 based on the combined set 404 of occupancy costs. Generating the combined set 404 of occupancy costs may include placing a plurality of graph nodes inside the planning horizon 240 at distance D (e.g., 6 m) from one another, and connecting the nodes with edges.

In some implementations, each of the nodes in the graph 602 may be associated with one or more locations q within the planning horizon 240. Furthermore, in some implementations, one of the nodes in the graph 602 may be associated with a location in the planning horizon that is currently occupied by the planning agent 100. Additionally or alternatively, in some implementations, one or more of the nodes in the graph 602 may be associated with locations within the planning horizon 240 that are occupied by the neighboring agents 220. Such nodes are herein referred to as "occupied nodes." Additionally or alternatively, one or more of the nodes in the graph 602 may be associated with locations in the planning horizon 240 that are unoccupied. Such nodes are herein referred to as "vacant nodes."

In some implementations, each of the vacant nodes in the graph 602 may be associated with one or more locations q that are associated with occupancy costs from the set 404. In this regard, each of the nodes in the graph 602 may be assigned a respective occupancy score. In some implementations, the occupancy score that is assigned to any given one of the nodes may be based on an occupancy cost from the set 404 that corresponds to a location that is associated with the given node. Additionally or alternatively, the occupancy score of any given node in the graph 602 may be based on multiple locations that are associated with the given node.

Additionally or alternatively, in some implementations, each node of the graph 602 may correspond to either a vacant region in the road 200 or an occupied region. As the name suggests, an "occupied region" may refer to a region in the road 200 in which one of the neighboring agents is currently situated. In this regard, in some implementations, the assignment of occupancy scores to nodes in the graph 602 may be performed in the same or similar manner as the assignment to different vacant regions, as discussed with respect to the process 500 of FIGS. 5A-B.

Additionally or alternatively, in some implementations, the combined set 404 of risk cost coefficients may be generated such that only one respective occupancy cost is present for the location(s) associated with each of the nodes in the graph 602. In such instances, the occupancy score for each of the graph nodes may be the same as the occupancy cost in the set 404 that is associated with the node's respective locations. In some implementations, the set of risk cost coefficients may be generated such that multiple occupancy costs are present for the location(s) associated with each of the nodes in the graph 602. In such implementations, assigning respective occupancy scores to the plurality of vacant regions 502 may include down-sampling the combined set 404 of occupancy costs to a resolution that matches the density and distribution of the nodes (in the graph 602) within the planning horizon 240.

The edges in the graph 602 may be classified as other straight traveling edges and lane change edges. Straight traveling edges may include edges that start and end in the same lane of the road 200. Lane change edges may be edges that start in one lane and end in another. The edges in the graph 602 may be assigned respective weights based on their classification. For example, straight traveling edges may be assigned a weight B, where B is a predetermined number. Occupied lane change edges, which: (i) start at the node corresponding to the current location of the planning agent 100, and (ii) end at another node in the graph 602 (hereinafter "destination node") may be assigned a weight that is equal to (or otherwise based on) the occupancy score of the destination node. And unoccupied lane change edges, which start at any node in the graph 602 other than the node corresponding to the current location of the planning agent 100, may be assigned a weight C, where C>D, to ensure that straight traveling edges would be preferred over unoccupied lane change edges for the purposes of planning a travel path.

At step 630, the planning agent 100 calculates a travel path 604 for the planning agent based on the graph. The travel path may be calculated using Dijkstra's shortest path algorithm and/or any other suitable type of algorithm. The travel path may include a plurality of edges of the graph 602. In some implementations, the travel path may be selected such that no edge in the travel path includes a weight that is greater than an occupancy cost threshold. In some implementations, the occupancy cost threshold may be the same or similar to the occupancy cost threshold discussed with respect to step 440 of the process 400. In some implementations, the occupancy cost threshold may be the same or similar to one of the thresholds $H_T$, $H_C$, and $H_T$, which are discussed above.

At step 640, the planning agent 100 is moved along a portion of the travel path 604. Moving the planning agent 100 along a portion of the travel path 604 may include changing at least one of the speed or direction of travel of the planning agent 100 to cause to planning agent to travel in a trajectory that is defined by one or more of the edges in the travel path 604.

At step 650, a determination is made whether to obtain a new combined set of occupancy costs. In some implementations, making the determination may include detecting whether a timer has expired and/or detecting whether a predetermined event has been generated in the control unit of the planning agent 100. If it is determined to obtain a new combined set of occupancy costs, the process 600 returns to step 610. Otherwise, if it is determined not to obtain a new combined set of reduced cost coefficients, the process 600 returns to step 640.

The process described with respect to FIGS. 1-6B are provided as an example. At least some of the steps in these processes may be performed in a different order or altogether omitted. Although in the present example, the processes described with respect to FIGS. 2-6B are performed (at least in part) by the processing circuitry 110 of the control unit 102, in some implementations the one or more of the steps in the processes may be performed by another device. Although in the examples provided throughout the disclosure, certain assumptions are provided for the purposes of mathematical proof, it will be understood that the present disclosure is in no way limited to any of these assumptions. Those of ordinary skill in the art will readily appreciate the that those assumptions can be readily substituted with various heuristics or algorithms that are based on sensor measurements and/or other information obtained by the planning agent 100.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms, do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

We claim:

1. A method for use in a planning agent, the method comprising:

identifying a first agent in a planning region of the planning agent;

identifying a location of the first agent and a velocity of the first agent;

calculating a set of occupancy costs for the first agent, each occupancy cost in the set of occupancy costs being associated with a different respective location in the planning region of the planning agent, each occupancy cost in the set of occupancy costs being calculated at least in part based on a cost function that depends on the location of the first agent and the velocity of the first agent, the cost function being arranged to use the velocity of the first agent to skew a distribution of the set of occupancy costs in a direction of travel of the first agent; and changing at least one of speed or direction of travel of the planning agent based on the set of occupancy costs, wherein each occupancy cost in the set of occupancy costs indicates a likelihood of the planning agent colliding with the first agent if the planning agent were to move in the occupancy cost's respective location.

2. The method of claim 1, wherein each occupancy cost in the set of occupancy costs is calculated further based on a Gaussian peak function having a deviation that is based on one or more physical dimensions of the first agent.

3. The method of claim 1, wherein:
the planning agent includes a first automobile that is traveling in a portion of a road,
the first agent includes a second automobile that is traveling in the portion of the road, and
each occupancy cost is associated with a different location in the portion of the road.

4. The method of claim 1, further comprising:
generating a graph based at least in part on the set of occupancy costs, the graph including a plurality of nodes and a plurality of edges, each one of the plurality of edges connecting a different pair of the plurality of nodes, each of the plurality of edges being associated with a respective weight;
calculating a travel path for the planning agent based on the graph, the travel path starting at a current location of the planning agent and ending at a second location in the planning region of the planning agent, the travel path being calculated based on the respective weights that are assigned to the plurality of edges;
wherein the speed or direction of travel of the planning agent is changed at least in part based on the travel path, and
wherein the respective weight of at least one of the plurality of edges is based on one or more occupancy costs that are part of the set of occupancy costs.

5. The method of claim 1, further comprising:
identifying a plurality of vacant regions in the planning region of the planning agent, each vacant region having an area that is sufficient to receive the planning agent;
assigning a plurality of occupancy scores to the plurality of vacant regions based on the set of occupancy costs, each one of the plurality of occupancy scores being assigned to a different one of the plurality of vacant regions; and
selecting one of the plurality of vacant regions based on one or more of the plurality of occupancy scores,
wherein changing the speed or direction of travel of the planning agent includes moving the planning agent into the selected vacant region.

6. The method of claim 1, further comprising:
detecting a characteristic of the first agent that is associated with a braking distance of the first agent; and
calculating an occupancy cost threshold that is based at least in part on the characteristic,
wherein the speed or direction of travel of the planning agent is changed further based on the occupancy cost threshold.

7. The method of claim 1, further comprising:
identifying a second agent in the planning region of the planning agent; and
identifying a location of the second agent and a velocity of the second agent,
wherein the set of occupancy costs includes a combined set of occupancy cost coeffects that is also associated with the second agent, and
wherein the cost function is further based on the location of the second agent and the velocity of the second agent.

8. A method for use in a planning agent, the method comprising:
identifying a first agent in a planning region of the planning agent;
identifying a location of the first agent and a velocity of the first agent;
calculating a set of occupancy costs for the first agent, each occupancy cost in the set of occupancy costs being associated with a different respective location in the planning region of the planning agent, each occupancy cost in the set of occupancy costs being calculated at least in part based on a cost function that depends on the location of the first agent and the velocity of the first agent;
identifying a plurality of vacant regions in the planning region of the planning agent, each vacant region having an area that is sufficient to receive the planning agent;
assigning a plurality of occupancy scores to the plurality of vacant regions based on the set of occupancy costs, each one of the plurality of occupancy scores being assigned to a different one of the plurality of vacant regions, wherein each vacant region is assigned a respective occupancy score based on whether the vacant region is located in a path of travel of the planning agent before the speed or direction of the planning agent is changed;
selecting one of the plurality of vacant regions based on one or more of the plurality of occupancy scores; and
changing at least one of speed or direction of travel of the planning agent based on the set of occupancy costs, wherein changing the speed or direction of travel of the planning agent includes moving the planning agent into the selected vacant region.

9. An apparatus comprising:
one or more sensors;
an acceleration system;
a steering system; and
a processing circuitry operatively coupled to the acceleration system, and the steering system, the processing circuitry being configured to:
identify a first agent in a planning region of the apparatus;
identify a location of the first agent and a velocity of the first agent;
calculate a set of occupancy costs for the first agent, each occupancy cost in the set of occupancy costs being associated with a different respective location in the planning region of the apparatus, each occupancy cost in the set of occupancy costs being calculated at least in part based on a cost function that depends on the location of the first agent and the velocity of the first agent, the cost function being arranged to use the velocity of the first agent to skew a distribution of the set of occupancy costs in a direction of travel of the first agent; and
change at least one of speed or direction of travel of the apparatus based on the set of occupancy costs,
wherein each occupancy cost in the set of occupancy costs indicates a likelihood of the planning agent colliding with the first agent if the planning agent were to move in the occupancy cost's respective location.

10. The apparatus of claim 9, wherein each occupancy cost in the set of occupancy costs is calculated further based on a Gaussian peak function having a deviation that is based on one or more physical dimensions of the first agent.

11. The apparatus of claim 9, wherein:
the apparatus includes a first automobile that is traveling in a portion of a road,
the first agent includes a second automobile that is traveling in the portion of the road, and
each occupancy cost is associated with a different location in the portion of the road.

12. The apparatus of claim 9, further comprising:
generating a graph based at least in part on the set of occupancy costs, the graph including a plurality of nodes and a plurality of edges, each one of the plurality of edges connecting a different pair of the plurality of nodes, each of the plurality of edges being associated with a respective weight;

calculating a travel path for the apparatus based on the graph, the travel path starting at a current location of the apparatus and ending at a second location in the planning region of the apparatus, the travel path being calculated based on the respective weights that are assigned to the plurality of edges;

wherein the speed or direction of travel of the apparatus is changed at least in part based on the travel path, and wherein the respective weight of at least one of the plurality of edges is based on one or more occupancy costs that are part of the set of occupancy costs.

13. The apparatus of claim 9, wherein the processing circuitry is further configured to:

identify a plurality of vacant regions in the planning region of the apparatus, each vacant region having an area that is sufficient to receive the apparatus;

assign a plurality of occupancy scores to the plurality of vacant regions based on the set of occupancy costs, each one of the plurality of occupancy scores being assigned to a different one of the plurality of vacant regions; and select one of the plurality of vacant regions based on one or more of the plurality of occupancy scores, wherein changing the speed or direction of travel of the apparatus includes moving the apparatus into the selected vacant region.

14. The apparatus of claim 9, further comprising:

detecting a characteristic of the first agent that is associated with a braking distance of the first agent; and calculating an occupancy cost threshold that is based at least in part on the characteristic, wherein the speed or direction of travel of the apparatus is changed further based on the occupancy cost threshold.

15. The apparatus of claim 9, wherein:

the processing circuitry is further configured to: identify a second agent in the planning region of the apparatus, and identify a location of the second agent and a velocity of the second agent;

the set of occupancy costs includes a combined set of occupancy cost coeffects that is also associated with the second agent; and the cost function is further based on the location of the second agent and the velocity of the second agent.

16. An apparatus comprising:

one or more sensors;

an acceleration system;

a steering system; and a processing circuitry operatively coupled to the acceleration system, and the steering system, the processing circuitry being configured to:

identify a first agent in a planning region of the apparatus;

identify a location of the first agent and a velocity of the first agent;

calculate a set of occupancy costs for the first agent, each occupancy cost in the set of occupancy costs being associated with a different respective location in the planning region of the apparatus, each occupancy cost in the set of occupancy costs being calculated at least in part based on a cost function that depends on the location of the first agent and the velocity of the first agent;

identify a plurality of vacant regions in the planning region of the apparatus, each vacant region having an area that is sufficient to receive the apparatus;

assign a plurality of occupancy scores to the plurality of vacant regions based on the set of occupancy costs, each one of the plurality of occupancy scores being assigned to a different one of the plurality of vacant regions, wherein each vacant region is assigned a respective occupancy score based on whether the vacant region is located in a path of travel of the apparatus before the speed or direction of the apparatus is changed;

select one of the plurality of vacant regions based on one or more of the plurality of occupancy scores; and change at least one of speed or direction of travel of the apparatus based on the set of occupancy costs wherein changing the speed or direction of travel of the apparatus includes moving the apparatus into the selected vacant region.

17. A non-transitory computer-readable medium storing one or more processor-executable instructions which when executed by a processing circuitry of a planning agent cause the processing circuitry to perform the operations of:

identifying a first agent in a planning region of the planning agent;

identifying a location of the first agent and a velocity of the first agent;

calculating a set of occupancy costs for the first agent, each occupancy cost in the set of occupancy costs being associated with a different respective location in the planning region of the planning agent, each occupancy cost in the set of occupancy costs being calculated at least in part based on a cost function that depends on the location of the first agent and the velocity of the first agent, the cost function being arranged to use the velocity of the first agent to skew a distribution of the set of occupancy costs in a direction of travel of the first agent; and changing at least one of speed or direction of travel of the planning agent based on the set of occupancy costs, wherein each occupancy cost in the set of occupancy costs indicates a likelihood of the planning agent colliding with the first agent if the planning agent were to move in the occupancy cost's respective location.

18. The non-transitory computer-readable medium of claim 17, wherein each occupancy cost in the set of occupancy costs is calculated further based on a Gaussian peak function having a deviation that is based on one or more physical dimensions of the first agent.

19. The non-transitory computer-readable medium of claim 17, wherein:

the planning agent includes a first automobile that is traveling in a portion of a road, the first agent includes a second automobile that is traveling in the portion of the road, and each occupancy cost is associated with a different location in the portion of the road.

20. The non-transitory computer-readable medium of claim 17, wherein the one or more processor-executable instructions which when executed by the processing circuitry further cause the processing circuitry to perform the operations of:

generating a graph based at least in part on the set of occupancy costs, the graph including a plurality of nodes and a plurality of edges, each one of the plurality of edges connecting a different pair of the plurality of nodes, each of the plurality of edges being associated with a respective weight; and calculating a travel path for the planning agent based on the graph, the travel path starting at a current location of the planning agent and ending at a second location in the planning region of the planning agent, the travel path being calculated based on the respective weights that are assigned to the plurality of edges, wherein the speed or direction of travel of the planning agent is changed at least in part based on the travel path, and wherein the respective weight of at least one of the plurality of edges is based on one or more occupancy costs that are part of the set of occupancy costs.

* * * * *